US009582744B2

(12) United States Patent
Hasegawa

(10) Patent No.: US 9,582,744 B2
(45) Date of Patent: Feb. 28, 2017

(54) IMAGE PROCESSING DEVICE AND COMPUTER-READABLE MEDIUM USING PHOTOGRAPHIC AND NON-PHOTOGRAPHIC CORRESPONDENCE DATA

(71) Applicant: Tomohiko Hasegawa, Okazaki (JP)

(72) Inventor: Tomohiko Hasegawa, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/032,562

(22) Filed: Sep. 20, 2013

(65) Prior Publication Data

US 2014/0092408 A1   Apr. 3, 2014

(30) Foreign Application Priority Data

Sep. 28, 2012   (JP) .................................. 2012-216757

(51) Int. Cl.
 *H04N 1/60* (2006.01)
 *G06K 15/02* (2006.01)
 (Continued)

(52) U.S. Cl.
 CPC ..... *G06K 15/1872* (2013.01); *H04N 1/40062* (2013.01); *H04N 1/4074* (2013.01)

(58) Field of Classification Search
 USPC ........................................................ 358/1.9
 See application file for complete search history.

(56) References Cited

U.S. PATENT DOCUMENTS 6,567,544 B1   5/2003 Kanno et al.
6,628,833 B1 *  9/2003 Horie ...................... G06T 5/001
                                               348/239

(Continued)

FOREIGN PATENT DOCUMENTS

JP          3-44268 A    2/1991
JP       H11-187266 A    7/1999
(Continued)

OTHER PUBLICATIONS

Notice of Reasons for Rejection dated Feb. 16, 2016 received in related application JP 2012-216757 together with an English language translation.

*Primary Examiner* — Christopher D Wait
(74) *Attorney, Agent, or Firm* — Scully, Scott, Murphy & Presser, P.C.

(57) ABSTRACT

An image processing device includes a processor and a memory. The image processing device acquires target image data including each pixel value of a plurality of pixels. The image processing device extracts a plurality of photographic pixels and a plurality of non-photographic pixels from the plurality of the pixels in the target image. The image processing device generates photographic correspondence data. The image processing device generates non-photographic correspondence data. The image processing device converts an original pixel value of a pixel of the plurality of photographic pixels into a respective converted pixel value by using the photographic correspondence data. The image processing device converts an original pixel value of a pixel of the plurality of non-photographic pixels into a respective converted pixel value by using the non-photographic correspondence data.

14 Claims, 22 Drawing Sheets

(51) Int. Cl.
    *H04N 1/40*         (2006.01)
    *H04N 1/407*       (2006.01)

(56) References Cited

U.S. PATENT DOCUMENTS

| | | | | |
|---|---|---|---|---|
| 2006/0210164 A1* | 9/2006 | Hideyuki | ................. | G06K 9/38 |
| | | | | 382/190 |
| 2008/0199076 A1* | 8/2008 | Matsuoka | .......... | G06K 9/00442 |
| | | | | 382/176 |

FOREIGN PATENT DOCUMENTS

| JP | 2003-125205 A | 4/2003 |
|---|---|---|
| JP | 2003-259123 A | 9/2003 |
| JP | 2004-056350 A | 2/2004 |
| JP | 2011-15172 A | 1/2011 |

\* cited by examiner

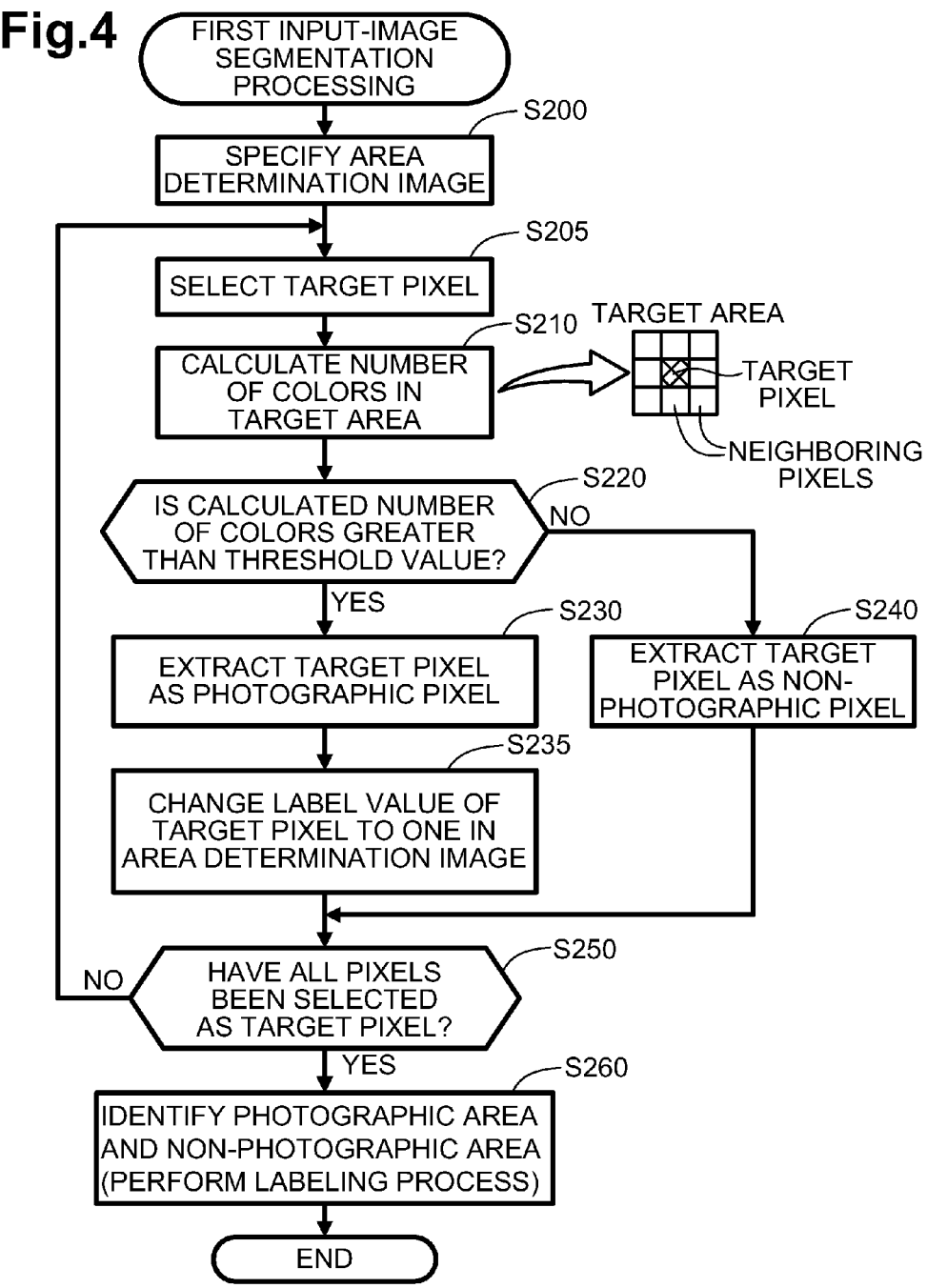

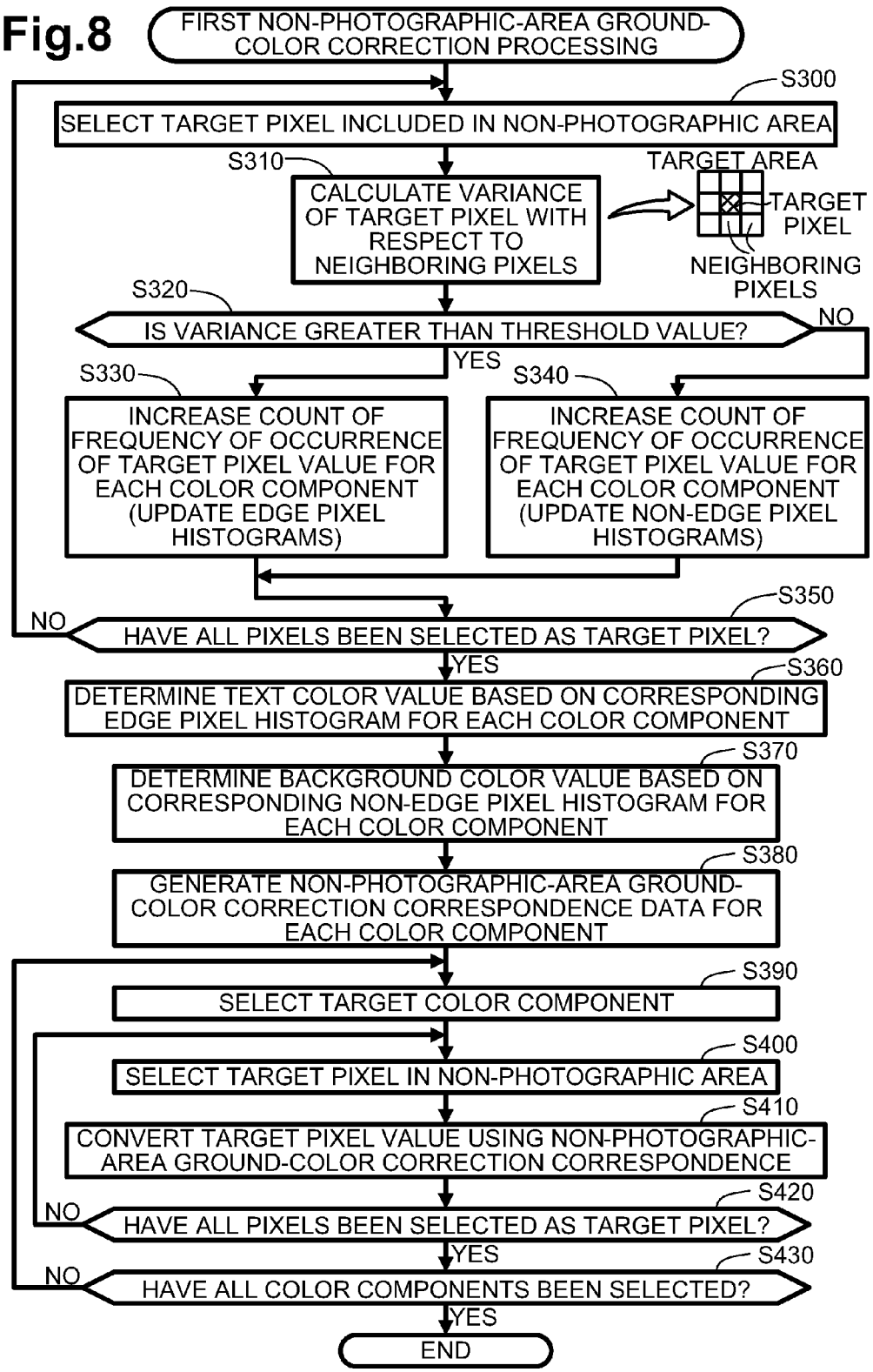

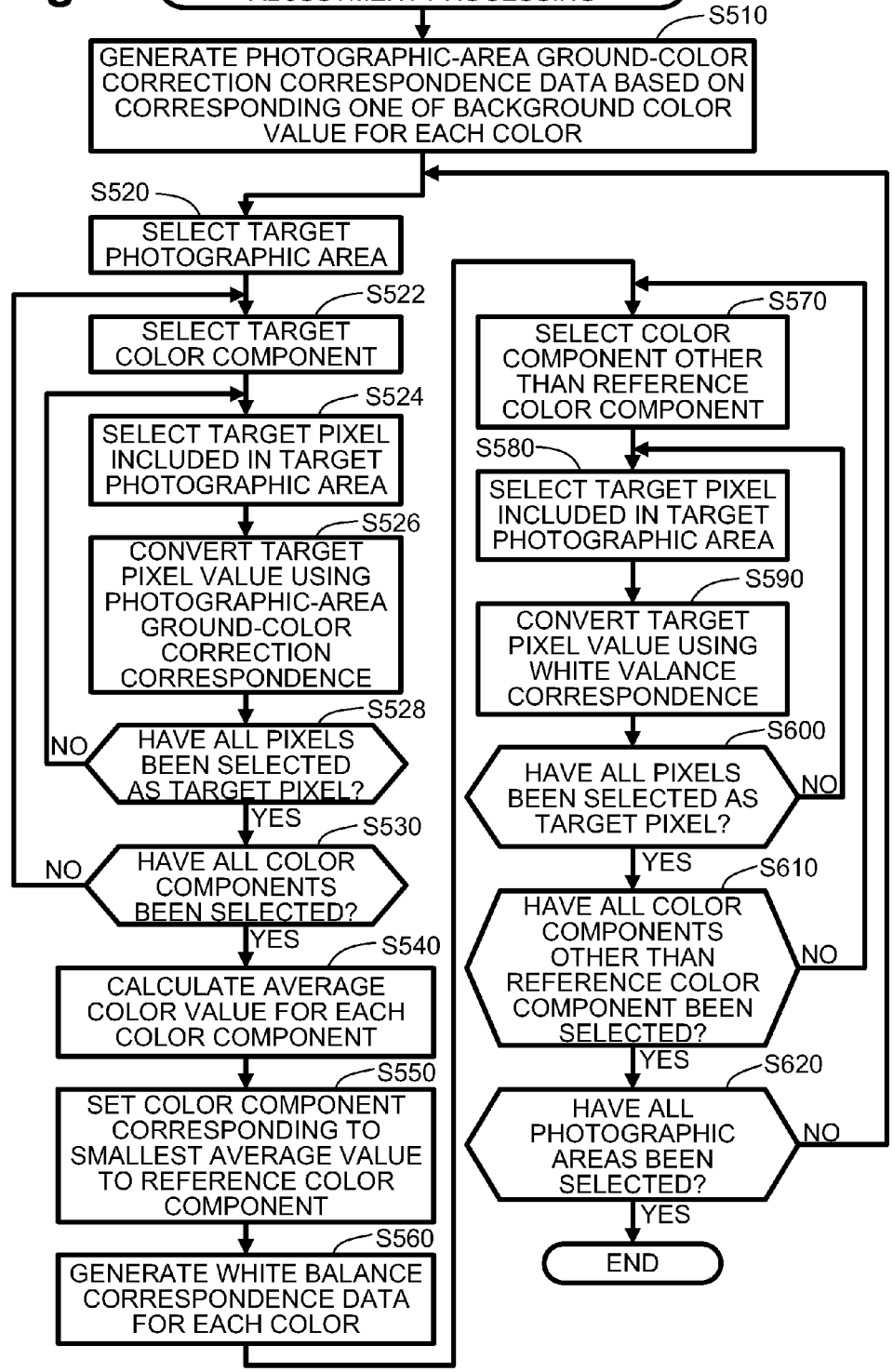

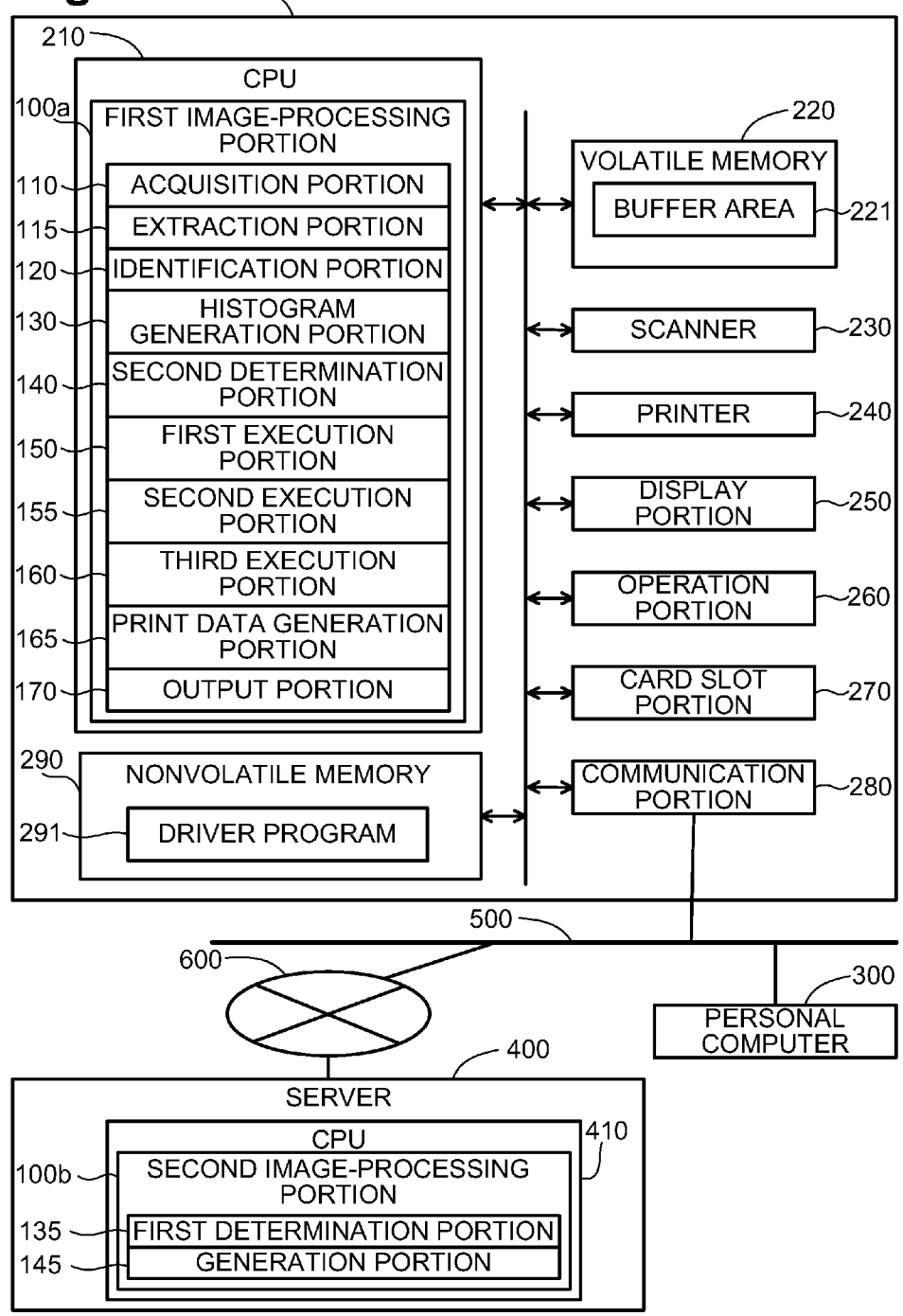

IMAGE PROCESSING DEVICE AND COMPUTER-READABLE MEDIUM USING PHOTOGRAPHIC AND NON-PHOTOGRAPHIC CORRESPONDENCE DATA

CROSS-REFERENCE TO RELATED APPLICATION

This application claims priority to Japanese Patent Application No. 2012-216757, filed on Sep. 28, 2012, which is incorporated herein by reference.

TECHNICAL FIELD

Aspects of the disclosure relate to a technique for converting pixel values of an image.

BACKGROUND

An image color adjustment technique has been known in which, for example, a ground color (e.g., a background color) is obtained from a histogram of an image and then color of the image is adjusted based on the ground color (see, for example, Japanese Laid-open Patent Publication No. HEI 3-44268).

SUMMARY

An image may include various kinds of objects, such as a photograph and a text. Nevertheless, in the known technique, not enough consideration may be given to generation of data defining a correspondence suitable to pixels included in both of an object including photographic pixels and an object including pixels of another kind, for example, text pixels. The correspondence may be used when a pixel value is converted for a color adjustment of an image. The correspondence may show a relationship between a pixel value before converted and a pixel value after converted.

Aspects of the disclosure provide for a technique for generating correspondence data defining an appropriate correspondence for a photographic pixel and correspondence data defining an appropriate correspondence for a non-photographic pixel.

The disclosure has been made to solve at least some of the above-described problems, and may be implemented as examples described below.

An image processing device comprises a processor and a memory. The memory stores computer-readable instructions therein. The processor executes the computer-readable instructions, which cause the image processing device to perform various processes in accordance therewith. In particular, the computer-readable instructions cause the image processing device to acquire target image data including each pixel value of a plurality of pixels. The target image data represents a target image by using the plurality of pixels. Further, the computer-readable instructions cause the image processing device to extract a plurality of photographic pixels and a plurality of non-photographic pixels from the plurality of the pixels in the target image. In addition, the computer-readable instructions cause the image processing device to generate photographic correspondence data. Moreover, the computer-readable instructions cause the image processing device to generate non-photographic correspondence data. The non-photographic correspondence data is different from the photographic correspondence data. In addition, the computer-readable instructions cause the image processing device to convert an original pixel value of a pixel of the plurality of photographic pixels into a respective converted pixel value by using the photographic correspondence data. Moreover, the computer-readable instructions cause the image processing device to convert an original pixel value of a pixel of the plurality of non-photographic pixels into a respective converted pixel value by using the non-photographic correspondence data.

According to the aspects of the disclosure, the converted pixel value with respect to the original pixel value differ from each other between the non-photographic correspondence data and the photographic correspondence data. Therefore, the correspondence data defining the correspondence suitable to a pixel of the plurality of photographic pixels and the correspondence data defining the correspondence suitable to a pixel of the plurality of non-photographic pixels may be generated respectively.

The one or more aspects of the disclosure may be accomplished in various manners, such as using image processing methods, computer-readable programs for implementing image processing methods, or recording media recording the computer-readable programs, as well as image processing devices.

BRIEF DESCRIPTION OF THE DRAWINGS

For a more complete understanding of the present disclosure, and the objects, features, and advantages thereof, reference now is made to the following descriptions taken in connection with the accompanying drawings.

FIG. 4 is a flowchart depicting first input-image segmentation processing in the illustrative embodiment according to one or more aspects of the disclosure.

FIG. 8 is a flowchart depicting first non-photographic-area ground-color correction processing in the illustrative embodiment according to one or more aspects of the disclosure.

FIG. 12 is a flowchart depicting first photographic-area color adjustment processing in the illustrative embodiment according to one or more aspects of the disclosure.

FIG. 22 illustrates a network system to which the multifunction peripheral is connected in a variation of the illustrative embodiment according to one or more aspects of the disclosure.

DETAILED DESCRIPTION OF EMBODIMENTS

A. Illustrative Embodiment

A-1. Configuration of Image Processing Device

Figure 1:
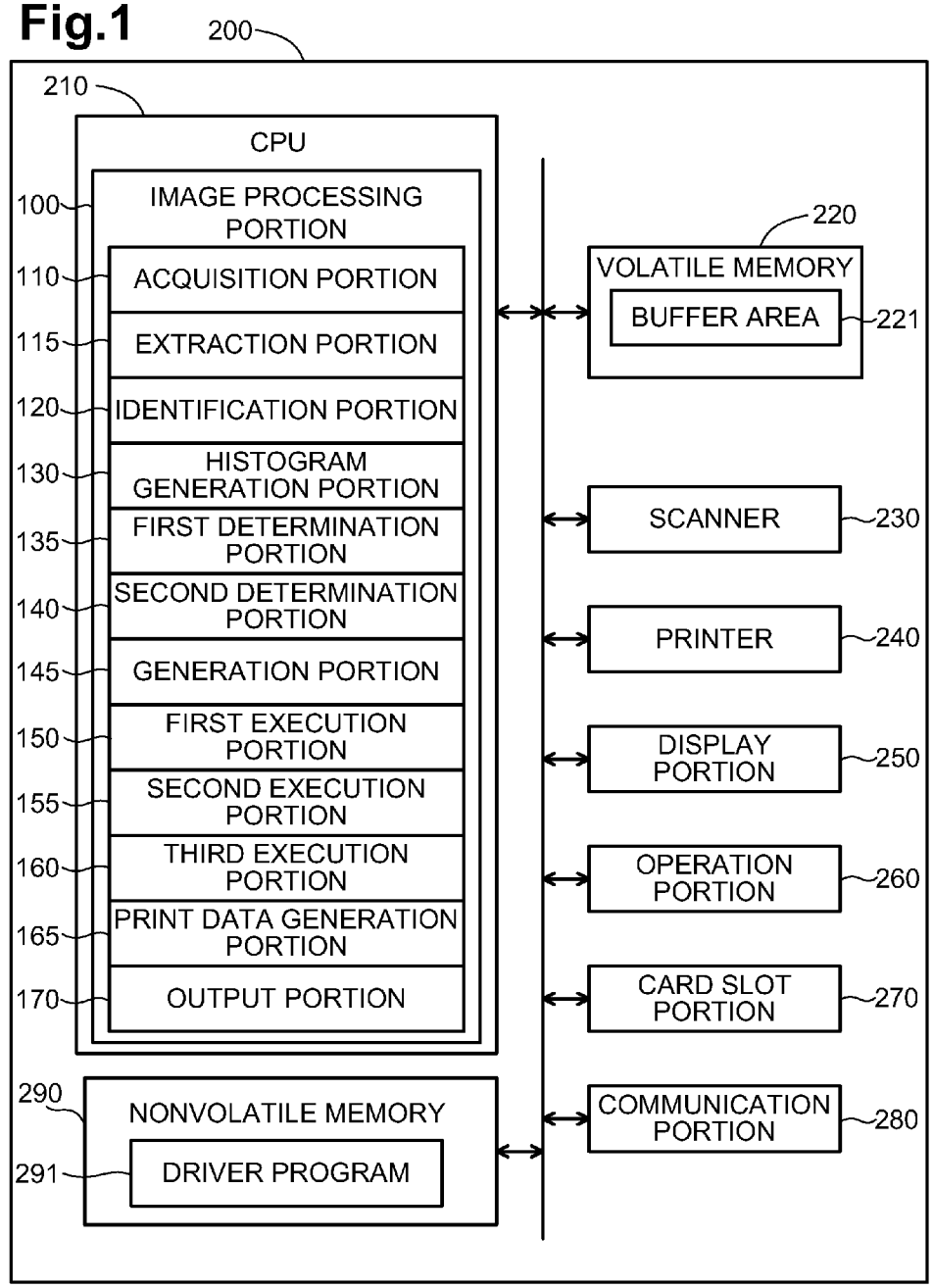
FIG. 1 is a block diagram depicting a configuration of a multifunction peripheral as an image processing device in an illustrative embodiment according to one or more aspects of the disclosure.

Aspects of the disclosure are described below in accordance with an illustrative embodiment. FIG. 1 is a block diagram depicting a configuration of a multifunction peripheral 200 as an image processing device.

The multifunction peripheral 200 comprises a central processing unit ("CPU") 210, a volatile memory 220 such as a dynamic random access memory ("DRAM"), a scanner 230, a printer 240, a display portion 250, an operation portion 260 such as a mouse and/or a keyboard, a card slot portion 270, a communication portion 280, and a nonvolatile memory 290 such as a hard disk drive and/or a flash memory. The cart slot portion 270 is configured such that a memory card (not depicted) is inserted thereto.

The volatile memory 220 comprises a buffer area 221 configured to temporarily store various data generated during execution of processing by the CPU 210. Alternatively, the CPU 210 may be configured to temporarily store various data in the nonvolatile memory 290, instead of the volatile memory 220.

The scanner 230 is an image reader configured to acquire scan data by reading a document using a photoelectric conversion element (e.g., a charge-coupled device ("CCD") or a complementary metal-oxide semiconductor ("CMOS")). The scan data is bitmap data consisting of RGB pixel data. The RGB pixel data is pixel data including color component values (e.g., each color component value includes level values of 256 levels) of three color components of red ("R"), green ("G"), and blue ("B"). Hereinafter, the red component, the green component, and the blue component of the color components are also referred to as an R component, a G component, and a B component, respectively.

The printer 240 is configured to perform printing in accordance with print data. The printer 240 is a so-called color inkjet printer. Alternatively, another type printer (e.g., a color laser printer) may be used as the printer 240. The display portion 250 is configured to display a setting screen for scanning an image or a selection screen for selecting a printing operation mode.

The nonvolatile memory 290 is configured to store a driver program 291. The driver program 291 may be, for example, prestored in the nonvolatile memory 290 by a manufacture of the multifunction peripheral 200 or supplied with a CD-ROM or a DVD-ROM.

The CPU 210 functions as an image processing portion 100 configured to perform image processing by execution of the driver program 291. The image processing portion 100 comprises an acquisition portion 110, an extraction portion 115, an identification portion 120, a histogram generation portion 130, a first determination portion 135, a second determination portion 140, a generation portion 145, a first execution portion 150, a second execution portion 155, a third execution portion 160, a print data generation portion 165, and an output portion 170. These function blocks are configured to perform image processing.

A-2. Image Processing

Figure 2:
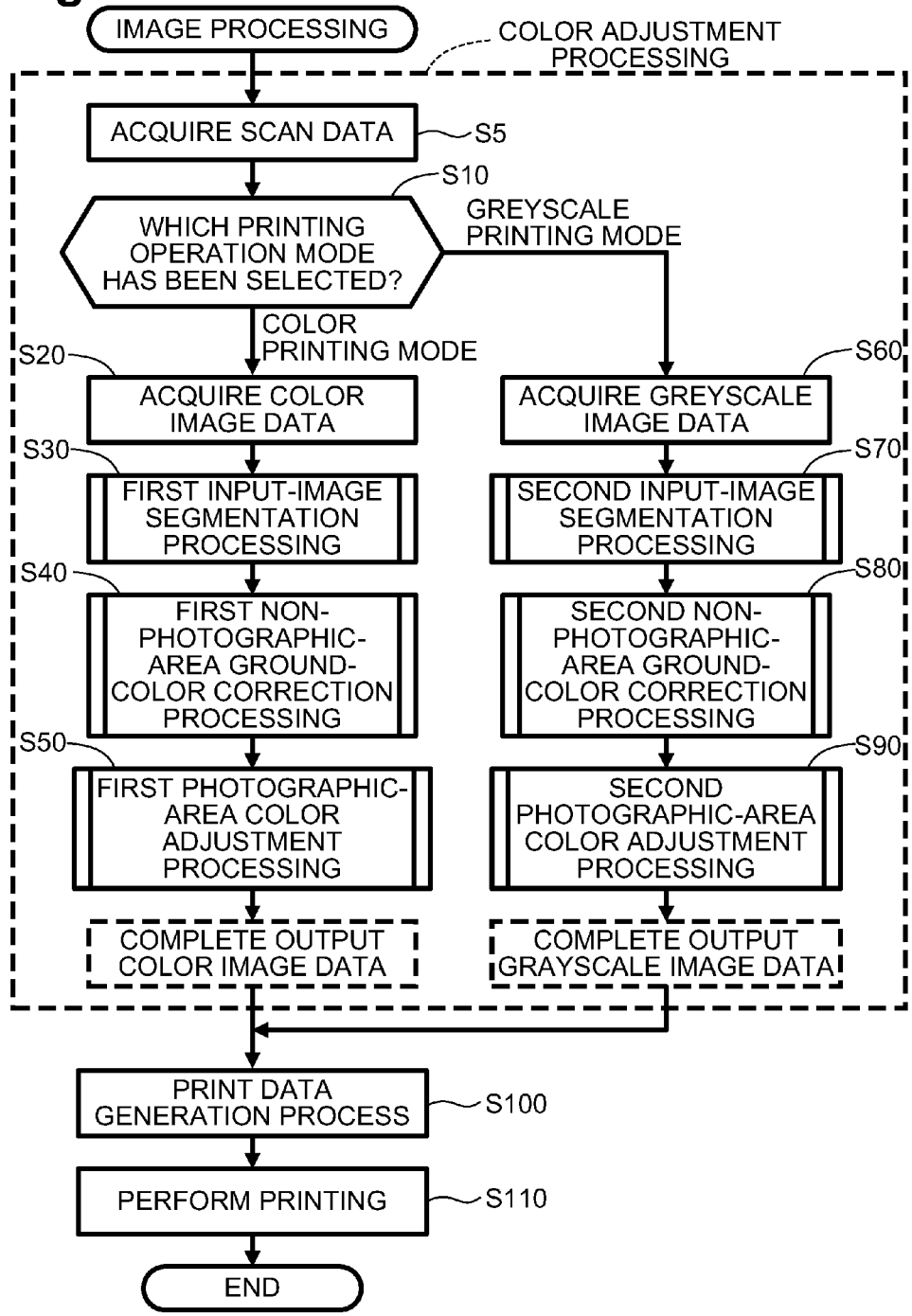
FIG. 2 is a flowchart depicting image processing in the illustrative embodiment according to one or more aspects of the disclosure.

FIG. 2 is a flowchart depicting image processing. The image processing is performed for executing printing after performing color adjustment processing using scan data. In the illustrative embodiment, the image processing starts as a user provides a copy instruction by operating the operation portion 260 after setting a document in the scanner 230. The user also provides an instruction of which one of a color printing mode and a greyscale printing mode should be adopted for a printing operation mode to produce a duplication (a print) at the time of providing the copy instruction by operating the operation portion 260.

In step S5 in FIG. 2, the acquisition portion 110 acquires scan data subject to processing. More specifically, the acquisition portion 110 allows the scanner 230 to read the document, acquires scan data from the scanner 230, and stores the acquired scan data in the volatile memory 220.

Then, in step S10, the acquisition portion 110 may determine which one of the color printing mode and the greyscale printing mode has been selected by the user as the printing operation mode. Hereinafter, a case in which the user selects the color printing mode (e.g., steps S20-S50) will be described first, and then, a case in which the user selects the greyscale printing mode (e.g., steps S60-S90) will be described.

A-2-1: Color Printing Mode

When the printing operation mode selected by the user is the color printing mode (e.g., COLOR PRINTING MODE in step S10), in step S20, the acquisition portion 110 adopts (or acquires) the scan data as it is as color image data subject to processing. Hereinafter, an image represented by color image data is also referred to as an input color image. The color image data is bitmap data consisting of pixel values of the R, G, and B components. The color image data is stored in the volatile memory 220.

Figure 3:
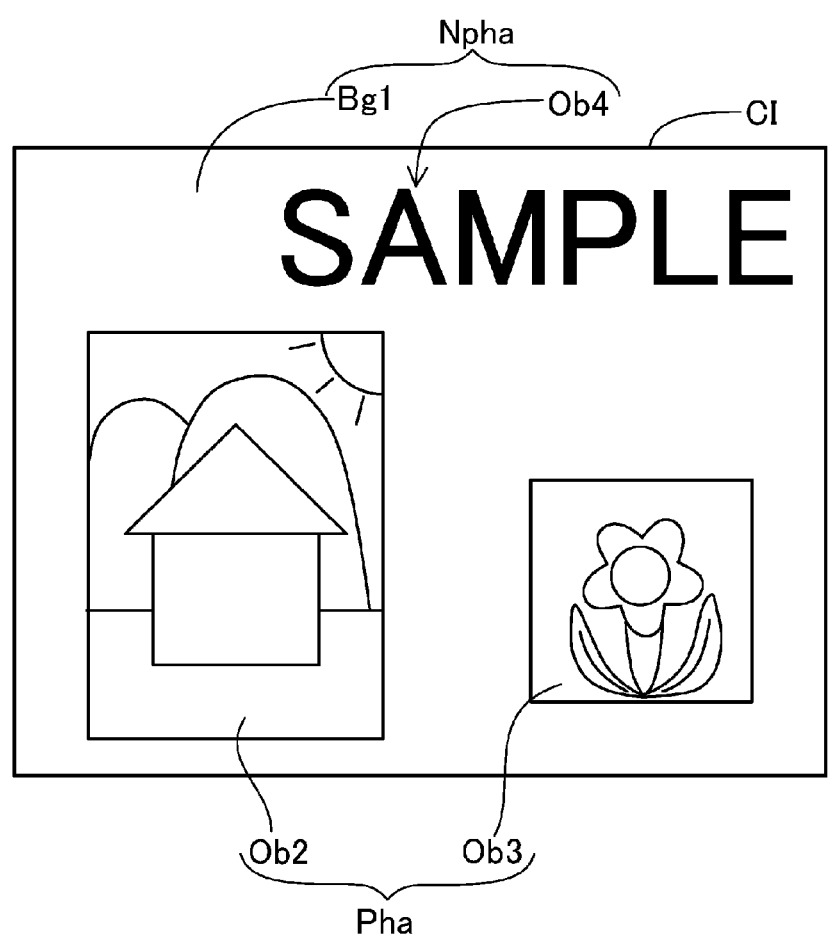
FIG. 3 illustrates an example of an input color image in the illustrative embodiment according to one or more aspects of the disclosure.

FIG. 3 illustrates an example of an input color image. As depicted in FIG. 3, an input color image CI comprises a background image Bg1, photographic images Ob2, Ob3 representing photographs, respectively, and a text image Ob4 representing text. A color of the background image Bg1 reflects a color (also, referred to as a ground color), e.g., light grey, of a medium (e.g., paper) of a document read by the scanner 230. The background image Bg1 consists of a plurality of background pixels. Each photographic image Ob2, Ob3 consists of a plurality of photographic pixels. The text image Ob4 consists of a plurality of text pixels. Assuming that the color image data acquired by the acquisition portion 110 in step S5 described above represents the input color image CI depicted in FIG. 3, the image processing will be described below.

Next, in step S30, the image processing portion 100 performs first input-image segmentation processing based on the acquired color image data. In the first input-image segmentation processing, the image processing portion 100 performs a labeling process to identify a photographic area and a non-photographic area in the input color image CI.

Figure 5A:
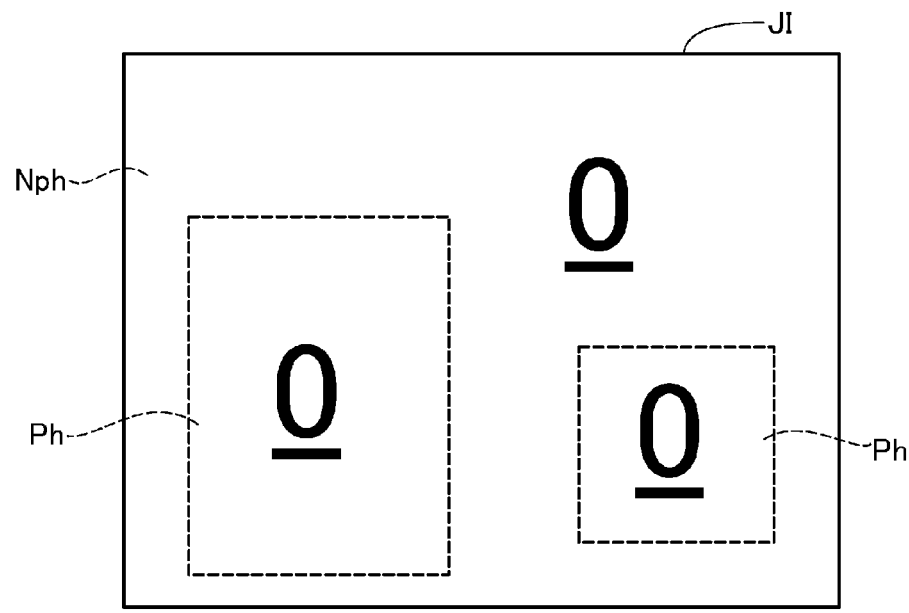
FIGS. 5A and 5B each illustrate an example of an area determination image in the illustrative embodiment according to one or more aspects of the disclosure.
Figure 5B:
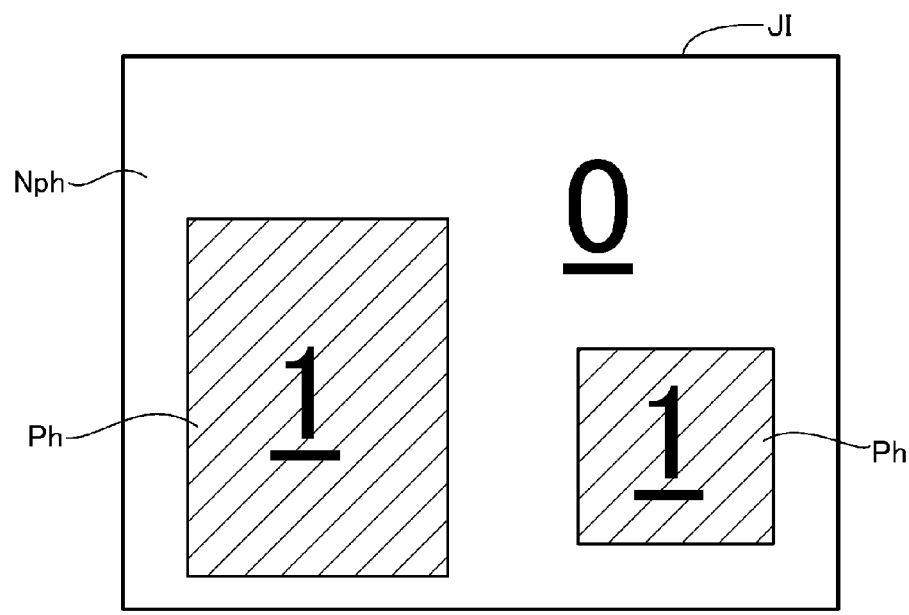

FIG. 4 is a flowchart depicting the first input-image segmentation processing. First, in step S200 in FIG. 4, the identification portion 120 specifies an area determination image JI. FIG. 5A and FIG. 5B illustrate an example of the area determination image JI. A plurality of pixels constituting the area determination image JI correspond a plurality of pixels constituting the input color image CI, respectively. At the time of step S200 (e.g., at the time of specifying the area determination image JI), as depicted in FIG. 5A, a level value of each pixel of the area determination image JI is assigned "0". The identification portion 120 stores label value data representing the label values of the respective pixels in the volatile memory 220.

Then, in step S205, the extraction portion 115 selects one pixel, from pixels of input color image CI that have not been processed in step S230 or in step S240, as a target pixel.

Figure 6:
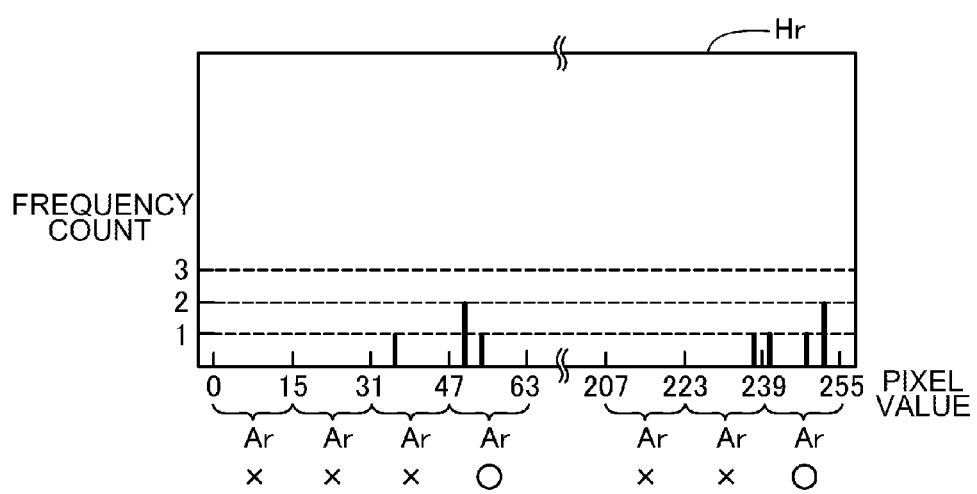
FIG. 6 is a histogram representing frequency of occurrence of each pixel value of an R component in pixels of a target area in the illustrative embodiment according to one or more aspects of the disclosure.

After that, in step S210, the extraction portion 115 may calculate a number of colors in a target area including the target pixel. In the illustrative embodiment, as depicted in FIG. 4 with an illustration shown on the right of step S210, the target area consists of a target pixel and eight neighboring pixels that surround the target pixel. That is, the target area consists of nine pixels arranged in a three-by-three matrix. Referring to FIG. 6, a method of calculating the number of colors in the target area will be described below.

First, the extraction portion 115 generates a histogram representing frequency of occurrence of each pixel value of the pixels included in the target area with respect to each of the R, G, and B components and stores data each representing one of the generated histograms in the volatile memory 220. FIG. 6 is a histogram Hr representing frequency of occurrence of each R-component pixel value in the pixels included in the target area. In the histogram Hr, a range of 0-255 pixel values is divided into 16 groups Ar representing 16 levels. Similar to this, in the histograms (not depicted) for the other color components (e.g., G and B components), a range of 0-255 pixel values is divided into 16 groups Ar of 16 levels.

The extraction portion 115 sums up counts of the frequency by each group Ar to calculate a total frequency (also, referred to as a group frequency) for each group Ar in the histogram Hr of the R component. Then, the extraction portion 115 determines one or more groups Ar whose each group frequency is greater than a predetermined threshold (e.g., 2), and obtains a number of determined groups Ar as the number of colors of the R component (also, referred to as an R-component color number). The extraction portion 115 also obtains the number of colors of the G component (also, referred to as a G-component color number) and the number of colors of the B component (also, referred to as a B-component color number) in a similar manner. The extraction portion 115 obtains a total of the R-component color number, the G-component color number, and the B-component color number, as the number of colors in the target area. In the histogram Hr in FIG. 6, an open circle "o" is indicated below a group Ar whose group frequency is greater than the predetermined threshold and a cross "x" is indicated below a group Ar whose group frequency is less than or equal to the predetermined threshold. In the example depicted in FIG. 6, the number of open circles (e.g., two in the illustrative embodiment) corresponds to the R-component color number.

After the calculation of the number of colors in the target area, in step S220 in FIG. 4, the extraction portion 115 determines whether the calculated number of colors is greater than a threshold value Th1 (e.g., 5). When the calculated number of colors is greater than the threshold value Th1 (e.g., YES in step S220), the extraction portion 115 extracts the target pixel as a photographic pixel (e.g., step S230). Then, in step S235, the identification portion 120 changes the label value of the pixel corresponding to the target pixel extracted as the photographic pixel from "0" to "1" in the area determination image JI (i.e., the identification portion 120 updates the label value data stored in the volatile memory 220).

When the calculated number of colors is less than or equal to the threshold value Th1 (e.g., NO in step S220), the extraction portion 115 extracts the target pixel as a non-photographic pixel (e.g., step S240). In this case, the identification portion 120 maintains the label value of the pixel corresponding to the target pixel extracted as the non-photographic pixel to "0" in the area determination image JI.

Next, in step S250, the extraction portion 115 determines whether all the pixels of the input color image CI have been selected as the target pixel. When all the pixels of the input color image CI have not been selected as the target pixel (e.g., NO in step S250), the extraction portion 115 goes back to step S205. When all the pixels of the input color image CI have been selected as the target pixel (e.g., YES in step S250), the extraction portion 115 goes to step S260.

As depicted in FIG. 5B, after the identification portion 120 performs the extraction of one of the photographic pixel and the non-photographic pixel with respect to all the pixels of the input color image CI, the label value of each pixel of the area determination image JI is one of "0" and "1". The label value "1" indicates that the pixel of the input color image CI corresponding to the pixel having the label value "1" is extracted as a photographic pixel in the area determination image JI. The label value "0" indicates that the pixel of the input color image CI corresponding to the pixel having the label value "0" is extracted as a non-photographic pixel in the area determination image JI.

After that, in step S260 in FIG. 4, the identification portion 120 performs the labeling process to identify photographic area or non-photographic area in the input color image CI. Hereinafter, the identification manner will be described in detail.

First, the identification portion 120 identifies an area consisting of a plurality of connected pixels having the label value "0" in the area determination image JI depicted in FIG.

5B, as a non-photographic area Nph, with reference to the label value data stored in the volatile memory 220. Further, the identification portion 120 identifies an area consisting of a plurality of connected pixels having the label value "1" (e.g., a hatched area in FIG. 5B) in the area determination image JI depicted in FIG. 5B, as a photographic area Ph. When there are photographic areas Ph that do not connect with each other (i.e., isolated from each other), the identification portion 120 changes the label values of the area determination image JI such that a plurality of pixels belonging to one photographic area Ph have the same label value and a plurality of pixels belonging to another photographic area Ph have the same label value that is different from the level value of the plurality of pixels belonging to the one photographic area Ph (i.e., the identification portion 120 updates the label value data stored in the volatile memory 220). An image representing the result of the labeling process is also referred to as a label image LI (described later with reference to FIG. 7). In the example of the area determination image JI depicted in FIG. 5B, two photographic areas Ph are identified and the photographic areas Ph do not connect with each other (i.e., isolated from each other).

To determine whether two pixels A and B are connected with each other, a determination method in which it is determined that the pixels A and B are connected with each other when the pixel B is located within a predetermined distance from the pixel A may be used. For example, it is assumed that the predetermined distance is a distance of 1.5 pixels in an image in which pixels are arranged in a matrix. In this case, when the pixel B is one of eight pixels surrounding the pixel A, it is determined that the pixels A and B are connected with each other.

Figure 7:
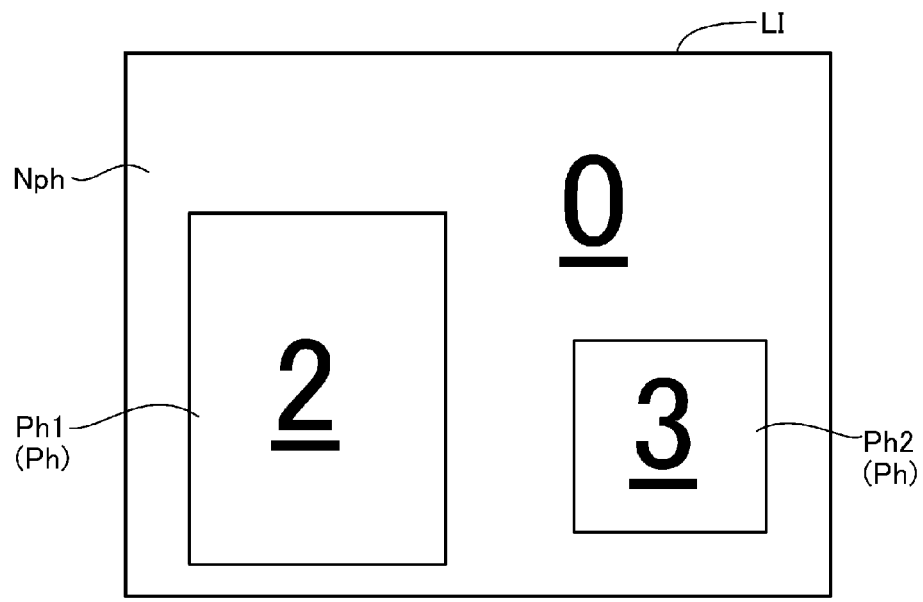
FIG. 7 illustrates an example of a label image in the illustrative embodiment according to one or more aspects of the disclosure.

FIG. 7 illustrates an example of the label image LI. Pixels constituting the label image LI correspond to the pixels included in the area determination image, respectively, after a positive determination is made in step S250 described above (e.g. YES in step S250). In the label image LI, image areas, each of which consists of pixels having the same label value, are identified, wherein the label values are different among the image areas. In the example of FIG. 7, a non-photographic area Nph, a photographic area Ph1, and a photographic area Ph2 are identified, wherein the non-photographic area Nph consists of pixels having the label value "0", the photographic area Ph1 consists of pixels having the label value "2", and the photographic area Ph2 consists of pixels having the label value "3". The identification portion 120 assigns each area Nph, Ph1, Ph2 a numerical value that is the same as the level value of the pixels constituting the area Nph, Ph1, Ph2 as an identifier (i.e. the labeling process). Thus, the one non-photographic area Nph and the two photographic areas Ph1, Ph2 become identifiable. These three image areas Nph, Ph1, Ph2 correspond to respective areas, each of which consists of a plurality of connected pixels in the input color image CI. That is, in the label image LI, the non-photographic area Nph corresponds to the area consisting of the background image Bg1 and the text image Ob4 in the input color image CI. The photographic area Ph1 corresponds to the photographic image Ob2 in the input color image CI. The photographic area Ph2 corresponds to the photographic image Ob3 in the input color image CI.

As a result, in the input color image CI, the photographic images Ob2, Ob3 are identified as photographic areas independently, and the area other than the photographic areas Ob2, Ob3 (i.e. the area consisting of the background image Bg1 and the text image Ob4) is identified as a non-photographic area. Hereinafter, as depicted in FIG. 3, in the input color image CI, the area identified as the photographic area is also referred to as a photographic area Pha and the area identified as the non-photographic area is also referred to as a non-photographic area Npha. After step S260 in FIG. 4, the identification portion 120 ends the first input-image segmentation processing.

After completing the first input-image segmentation processing in step S30 in FIG. 2, next, the image processing portion 100 performs first non-photographic-area ground-color correction processing (e.g. step S40). In the first non-photographic-area ground-color correction processing, a ground color that is the background color in the non-photographic area of the input color image CI is corrected to white. Generally, the ground color is a color representing a medium (e.g. paper) of the document scanned by the scanner 230.

FIG. 8 is a flowchart depicting the first non-photographic-area ground-color correction processing. In step S300, the extraction portion 115 identifies the non-photographic area Npha of the input color image CI with reference to the label value data stored in the volatile memory 220, and selects one pixel, on which neither of processing in step S330 nor processing in step S340 has been performed, of the pixels of the non-photographic area Npha, as the target pixel.

Then, in step S310, the extraction portion 115 calculates a variance of the target pixel with respect to its neighboring pixels. In the illustrative embodiment, as depicted in FIG. 8 with an illustration shown on the right of step S310, the target area consists of a target pixel and eight neighboring pixels that surround the target pixel. That is, the target area consists of nine pixels arranged in a three-by-three matrix. More specifically, the extraction portion 115 calculates an intensity value Y of each of the nine pixels in the target area using Equation (EQ1) below.

$$\text{Intensity value } Y = ((0.298912 \times R) + (0.586611 \times G) + (0.114478 \times B)) \quad (EQ1)$$

In Equation (EQ1), "R" represents an R-component pixel value, "G" represents a G-component pixel value, and "B" represents a B-component pixel value.

Then, the extraction portion 115 calculates a variance of an intensity value Y of the target pixel based on a known calculation formula using the intensity values Y of the nine pixels in the target area.

Figure 9A:
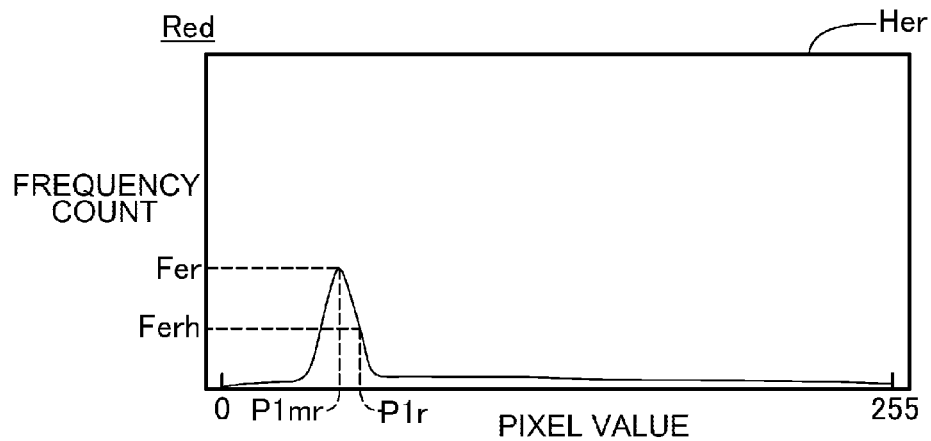
FIGS. 9A-9C each illustrate an edge pixel histogram for a color component in the illustrative embodiment according to one or more aspects of the disclosure.
Figure 9B:
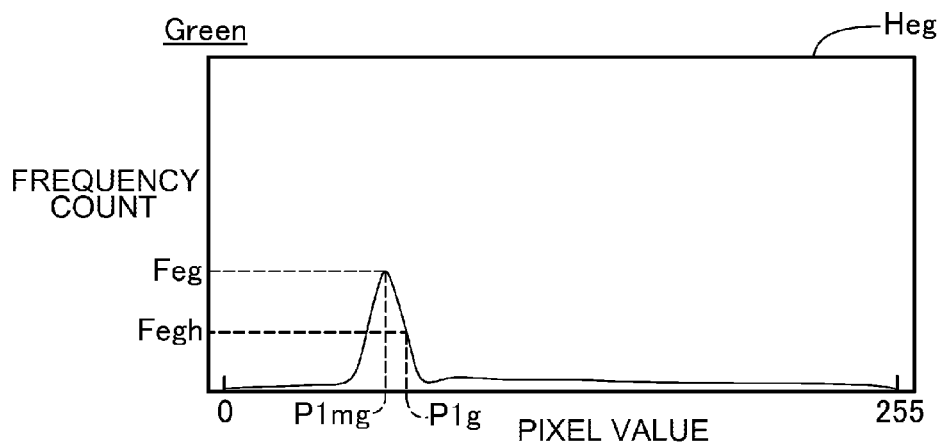
Figure 9C:
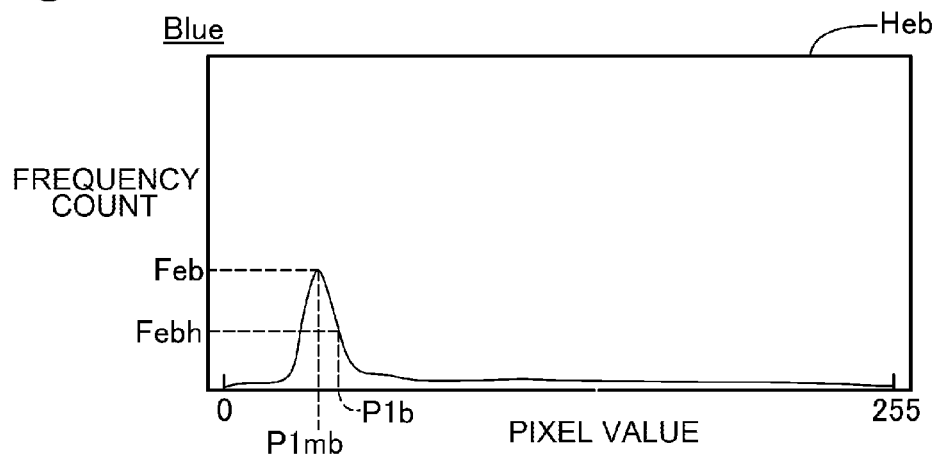

Next, in step S320, the extraction portion 115 determines whether the calculated variance is greater than a threshold value Th2. When the calculated variance is greater than the threshold value Th2 (e.g., YES in step S320), the extraction portion 115 determines that the target pixel is an edge pixel. Then, the histogram generation portion 130 performs a process in which the count of the frequency of occurrence of the pixel value (also referred to as a target pixel value) of the target pixel is increased by one with respect to each color component in each edge pixel histogram depicted in FIGS. 9A-9C (e.g., step S330). That is, the histogram generation portion 130 updates the edge pixel histograms and stores edge pixel histogram data each representing the updated edge pixel histogram in the volatile memory 220. When the edge pixel histograms are updated for the first time after the start of the first non-photographic-area ground-color correction processing depicted in FIG. 8, the edge pixel histograms are initialized before updated. FIGS. 9A-9C each illustrate an edge pixel histogram for a color component. More specifically, FIG. 9A illustrates a histogram Her for the R-component pixel value, FIG. 9B illustrates a histogram Heg for the G-component pixel value, and FIG. 9C illustrates a histogram Heb for the B-component pixel value. In the input color image CI depicted in FIG. 3, for example, a pixel included in an outline of the text image Ob4 may be an edge pixel.

Figure 10A:
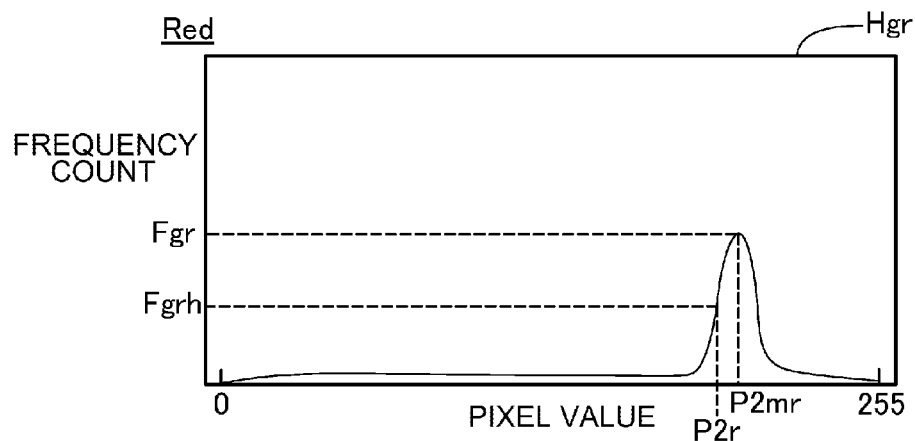
FIGS. 10A-10C each illustrate a non-edge pixel histogram for a color component in the illustrative embodiment according to one or more aspects of the disclosure.
Figure 10B:
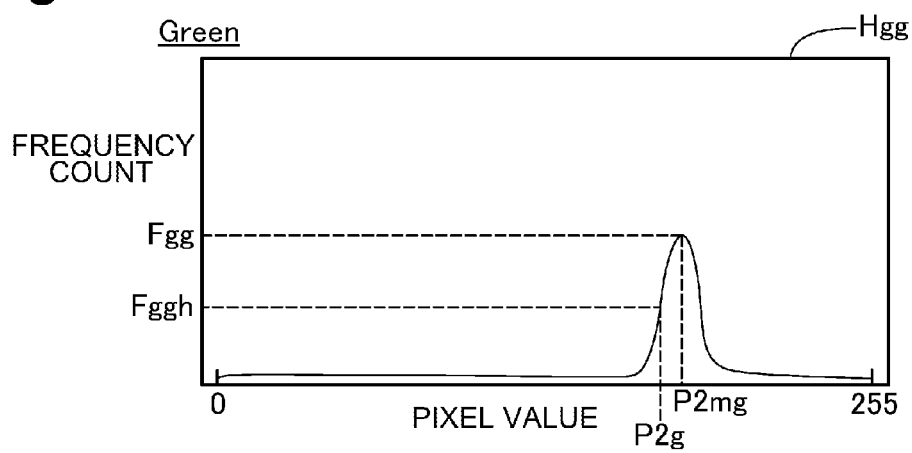
Figure 10C:
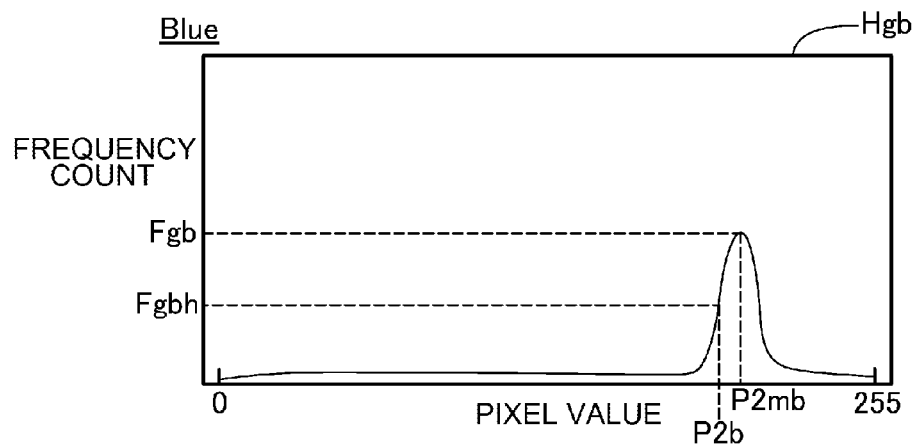

On the other hand, when the variance is smaller than or equal to the threshold value Th2 (e.g. NO in step S320), the extraction portion 115 determines that the target pixel is a non-edge pixel that is not an edge pixel. Then, the histogram generation portion 130 performs a process in which the count of the frequency of occurrence of the target pixel value is increased by one with respect to each color component in each non-edge pixel histogram depicted in FIGS. 10A-10C (e.g., step S340). That is, the histogram generation portion 130 updates the non-edge pixel histograms and stores non-edge pixel histogram data each representing the updated non-edge pixel histogram in the volatile memory 220. When the non-edge pixel histograms are updated for the first time after the start of the first non-photographic-area ground-color correction processing depicted in FIG. 8, the non-edge pixel histograms are initialized before updated. FIGS. 10A-10C each illustrate a non-edge pixel histogram for a color component. More specifically, FIG. 10A illustrates a histogram Hgr for the R-component pixel value, FIG. 10B illustrates a histogram Hgg for the G-component pixel value, and FIG. 10C illustrates a histogram Hgb for the B-component pixel value.

After step S330 or step S340, in step S350, the extraction portion 115 determines whether all the pixels included in the non-photographic area Npha have been selected as the target pixel. When all the pixels included in the non-photographic area Npha have not been selected as the target pixel (e.g., NO in step S350), the extraction portion 115 goes back to step S300. When all the pixels included in the non-photographic area Npha have been selected as the target pixel (e.g., YES in step S350), the extraction portion 115 goes to step S360.

In step S360, the first determination portion 135 determines a text color value for each color component based on a corresponding one of the edge pixel histograms depicted in FIGS. 9A-9C with reference to the edge pixel histogram data stored in the volatile memory 220. More specifically, the first determination portion 135 identifies a pixel value having the highest frequency count (also referred to as a peak value) in each color-component edge pixel histogram. Then, the first determination portion 135 determines a pixel value that is greater than the pixel value having the highest frequency count and has a frequency count that is half of the highest frequency count, as a text color value of the color component. For example, as depicted in FIG. 9A, the first determination portion 135 identifies a pixel value P1mr having the highest frequency count Fer in the R-component edge pixel histogram Her. Then, the first determination portion 135 determines a pixel value P1r that is greater than the pixel value P1mr and has a frequency count Ferh that is half of the highest frequency count Fer, as a text color value of the R component. Similarly, the first determination portion 135 identifies pixel values P1mg and P1mb having the highest frequency counts Feg and Feb, respectively, in the respective G- and B-component edge pixel histograms Heg, Heb. Then, the first determination portion 135 determines pixel values P1g and P1b that are greater than the pixel values P1mg and P1mb, respectively, and have frequency counts Fegh and Febh, respectively, that are half of the highest frequency counts Feg and Feb, respectively, as text color values of the G and B component, respectively (see FIGS. 9B and 9C). Hereinafter, the text color values of the R, G, and B components are referred to as the text color values P1r, P1g, and P1b, respectively. The first determination portion 135 then stores text color value data representing the text color values P1r, P1g, P1b, respectively, in the volatile memory 220.

In the illustrative embodiment, the first determination portion 135 determines a pixel value that is greater than a pixel value having the highest frequency count and has a frequency count that is half of the highest frequency count, as a text color value of a color component. Nevertheless, the method of determining the text color value is not limited to the specific embodiment. For example, in other embodiments, the first determination portion 135 may determine a pixel value that is greater than a pixel value having the highest frequency count and has a frequency count that is a predetermined percentage of the highest frequency count, as the text color value, wherein the predetermined percentage that is greater than 0 and smaller than 1 (i.e., Ferh=Fer×x (where 0<x<1)). Further, the first determination portion 135 may determine an average value or a median value of the pixel value of the edge pixel as the text color value. Alternatively, the first determination portion 135 may determine a pixel value having the highest frequency count itself as the text color value.

Next, in step S370, the second determination portion 140 determines a background color value for each color component based on a corresponding one of the non-edge pixel histograms depicted in FIGS. 10A-10C with reference to the non-edge pixel histogram data stored in the volatile memory 220. More specifically, the second determination portion 140 identifies a pixel value having the highest frequency count (i.e. the peak value) in each color-component non-edge pixel histogram. The second determination portion 140 determines a pixel value that is smaller than the pixel value having the highest frequency count and has a frequency count that is half of the highest frequency count, as a background color value of a color component. For example, as depicted in FIG. 10A, the second determination portion 140 identifies a pixel value P2mr having the highest frequency count Fgr in the R-component non-edge pixel histogram Hgr. Then, the second determination portion 140 determines a pixel value P2r, which is smaller than the pixel value P2mr and has a frequency count Fgrh that is half of the highest frequency count Fgr, as a background color value of the R component. Similar to this, the second determination portion 140 identifies pixel values P2mg, P2mb having the highest frequency counts Fgg, Fgb, respectively, in the respective G- and B-component non-edge pixel histograms Hgg, Hgb. Then, the second determination portion 140 determines pixel values P2g, P2b that are smaller than the pixel values P2mg and P2mb, respectively, and have frequency counts Fggh and Fgbh, respectively, that are half of the highest frequency counts Fgg and Fgb, respectively, as background color values of the G and B components, respectively (see FIGS. 10B and 10C). Hereinafter, the background color values of the R, G, and B components are also referred to as the background color values P2r, P2g, and P2b, respectively. The second determination portion 140 stores background color value data representing the background color values P2r, P2g, P2b, respectively, in the volatile memory 220.

In the illustrative embodiment, the second determination portion 140 determines a pixel value that is smaller than a pixel value having the highest frequency count and has a frequency count that is half of the highest frequency count, as a background color value of a color component. Nevertheless, the method of determining the background color value is not limited to the specific embodiment. For example, in other embodiments, the second determination portion 140 may determine a pixel value that is smaller than a pixel value having the highest frequency count and has a frequency count that is a predetermined percentage of the highest frequency count, as a background color value, wherein the predetermined percentage that is greater than 0 and smaller than 1 (i.e., Ferh=Ferxx (where 0<x<1)). Further, the second determination portion 140 may determine an average value or a median value of the pixel value of the non-edge pixel as the background color value. Alternatively, the second determination portion 140 may determine a pixel value of the highest frequency count itself as the background color value.

Next, in step S380, the generation portion 145 identifies the text color values P1r, P1g, P1b and the background color values P2r, P2g, P2b with reference to the text color value data and the background color value data stored in the volatile memory 220. Then, the generation portion 145 generates, for each color component, non-photographic-area ground-color correction correspondence data defining a non-photographic-area ground-color correction correspondence for one of R, G, and B components depicted in FIGS. 11A-11C based on the identified text color values P1r, P1g, P1b and background color values P2r, P2g, P2b, and stores the generated non-photographic-area ground-color correction correspondence data for each color component in the volatile memory 220.

Figure 11A:
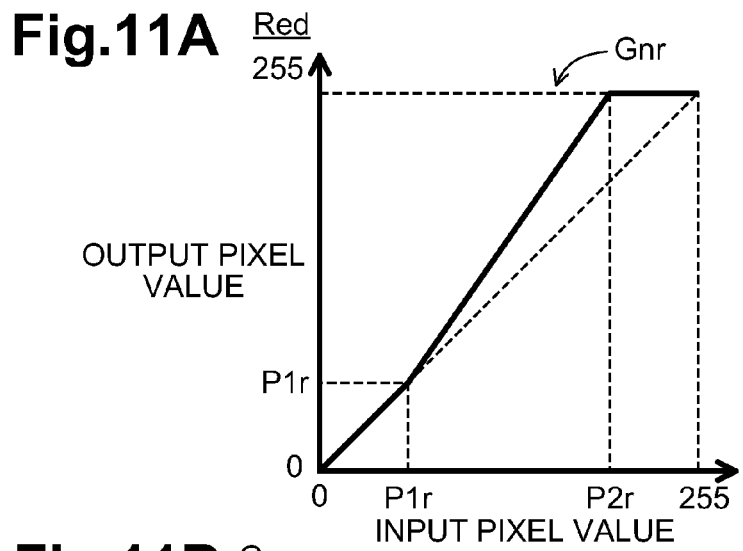
FIGS. 11A-11C each illustrate a non-photographic-area ground-color correction correspondence for a color component in the illustrative embodiment according to one or more aspects of the disclosure.
Figure 11B:
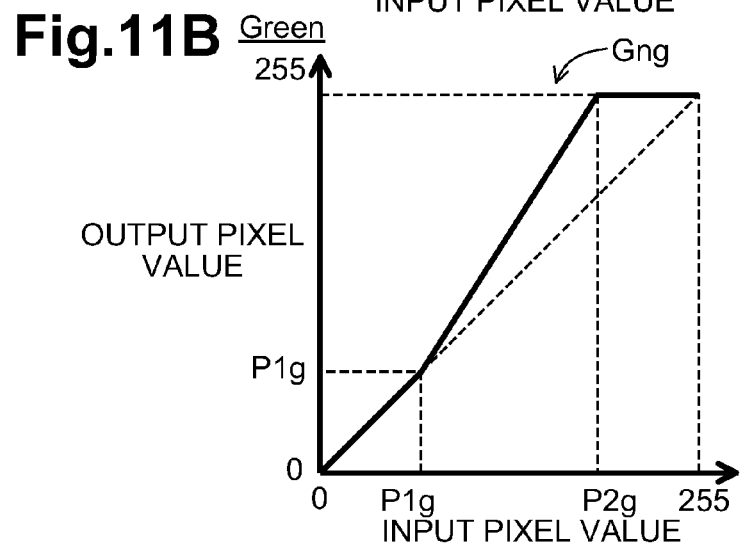
Figure 11C:
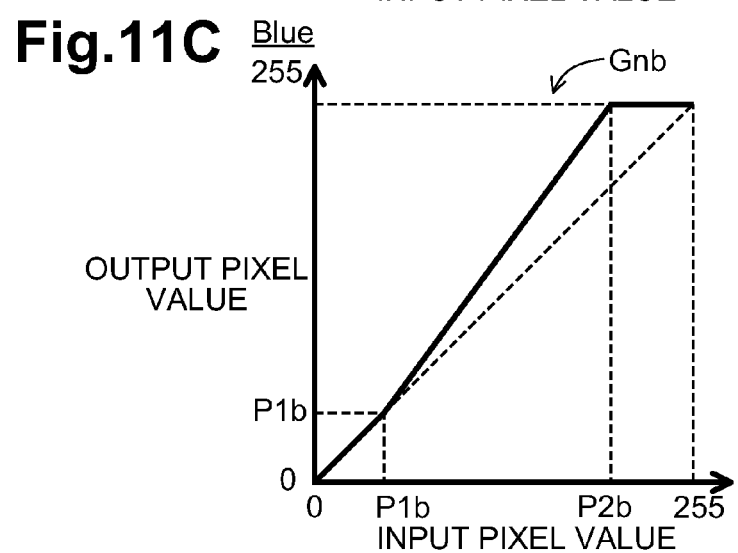

FIGS. 11A-11C each illustrate a non-photographic-area ground-color correction correspondence for a color component. More specifically, FIG. 11A illustrates a non-photographic-area ground-color correction correspondence Gnr for the R component, FIG. 11B illustrates a non-photographic-area ground-color correction correspondence Gng for the G component, and FIG. 11C illustrates a non-photographic-area ground-color correction correspondence Gnb for the B component. Each of the non-photographic-area ground-color correction correspondences include at least features (1)-(4) described below, as depicted in FIGS. 11A-11C.

(1) A feature that, within a range in which a pixel value before converted (hereinafter, also referred to as an input pixel value) is greater than or equal to 0 and smaller than or equal to a text color value P1r, P1g, P1b, a pixel value after converted (hereinafter, also referred to as an output pixel value) has the same value as the input pixel value. In other words, a feature that an input pixel value that is smaller than or equal to the text color value P1r, P1g, P1b is associated with an output pixel value having the same value as the input pixel value.

(2) A feature that, within a range in which an input pixel value is greater than the text color value P1r, P1g, P1b and smaller than a background color value P2r, P2g, P2b, an amount of change in the output pixel value increases in proportion to an amount of change in the input pixel value.

(3) A feature that any input pixel value that is greater than or equal to the background color value P2r, P2g, P2b is associated with the same output pixel value representing white.

(4) A feature that the output pixel value changes continuously with respect to the change of the input pixel value within an entire range of the input pixel value.

In feature (3), "the same pixel value representing white" is "255". Hereinafter, in the description, "the same pixel value representing white" also refers to "255". Nevertheless, "the same pixel value" is not limited to the specific embodiment. In other embodiments, for example, "the same pixel value representing a color close to white" (e.g., a value smaller than "255" (e.g., 250)) may be adopted instead of "the same pixel value representing white".

In the illustrative embodiment, as described in feature (2), the amount of change in the output pixel value increases in proportion to the amount of change in the input pixel value within the range in which the input pixel value is greater than the text color value P1r, P1g, P1b and smaller than the background color value P2r, P2g, P2b. Nevertheless, the feature is not limited to the specific embodiment. For example, the output pixel value may increase along a curve. Generally speaking, it may be desirable that the output pixel value increases monotonically (may not decrease) within the range in which the input pixel value is greater than the text color value P1r, P1g, P1b and smaller than the background color value P2r, P2g, P2b. A monotonic increase in a narrow sense in which an output pixel value always increases is preferable to a monotonic increase in a broad sense in which an output pixel value may be kept constant over given range.

After generating the non-photographic-area ground-color correction correspondence data, in step S390 in FIG. 8, the first execution portion 150 selects one color component on which processing of step S410 has not been performed yet, from the R, G, and B components, as a target color component.

Then, in step S400, the first execution portion 150 identifies the non-photographic area Npha of the input color image CI with reference to the label value data stored in the volatile memory 220, and selects one pixel on which processing of step S410 has not been performed yet, from the pixels included in the identified non-photographic area Npha, as the target pixel.

Next, in step S410, the first execution portion 150 converts a target pixel value of the target color component of the target pixel into an output pixel value of the target color component using the non-photographic-area ground-color correction correspondence for the target color component with reference to the color image data and non-photographic-area ground-color correction correspondence data stored in the volatile memory 220, with the target pixel value being regarded as an input pixel value. After that, the first execution portion 150 stores the converted output pixel value in the volatile memory 220.

Next, in step S420, when all the pixels included in the non-photographic area Npha have not been selected as the target pixel (e.g., NO in step S420), the first execution portion 150 goes back to step S400. When all the pixels included in the non-photographic area Npha have been selected as the target pixel (e.g., YES in step S420), the first execution portion 150 goes to step S430.

In step S430, the first execution portion 150 determines whether all the color components have been selected as a target color component. When all the color components have not been selected as the target color component (e.g., NO in step S430), the first execution portion 150 goes back to step S390. When all the color components have been selected as the target color component (e.g., YES in step S430), the first execution portion 150 ends the first non-photographic-area ground-color correction processing.

After the first non-photographic-area ground-color correction processing (e.g., step S40) depicted in FIG. 2, in step S50, the image processing portion 100 performs first photographic-area color adjustment processing. In the first photographic-area color adjustment processing, ground-color correction processing in which a ground color that is a background color of the photographic area Pha in the input color image CI is corrected to white and white balance processing are performed.

FIG. 12 is a flowchart depicting the first photographic-area color adjustment processing. First, in step S510, the generation portion 145 specifies the background color values P2r, P2g, P2b with reference to the background color value data stored in the volatile memory 220. Then, the generation portion 145 generates, for each color component, photographic-area ground-color correction correspondence data defining a photographic-area ground-color correction correspondence, based on a corresponding one of the background color values P2r, P2g, P2b, and stores the generated photographic-area ground-color correction correspondence data for each color component in the volatile memory 220.

Figure 13A:
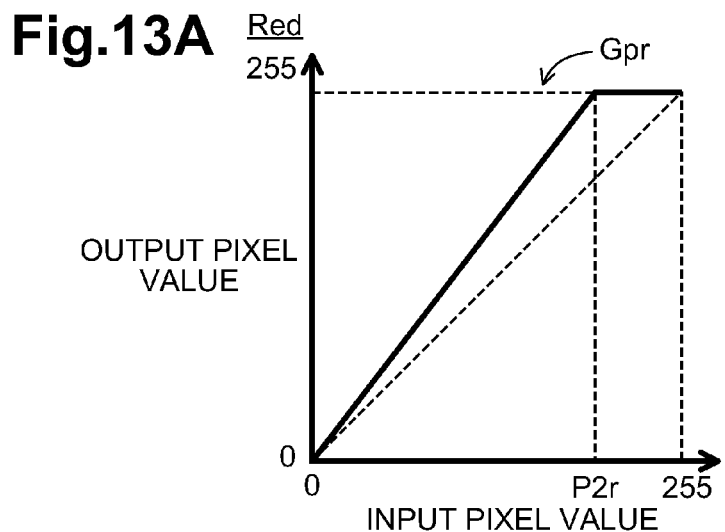
FIGS. 13A-13C each illustrate a photographic-area ground-color correction correspondence for a color component in the illustrative embodiment according to one or more aspects of the disclosure.
Figure 13B:
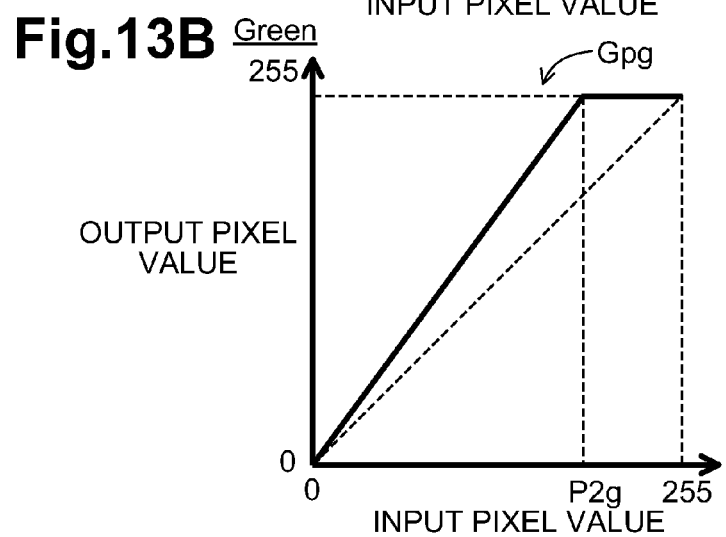
Figure 13C:
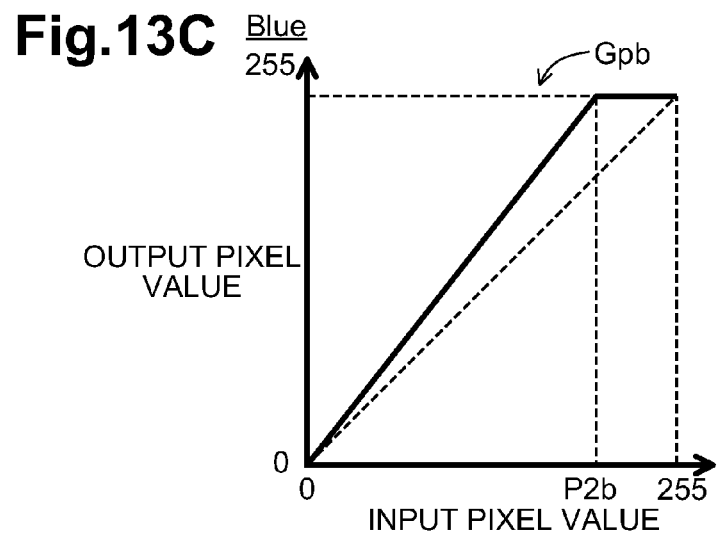

FIGS. 13A-13C each illustrate the photographic-area ground-color correction correspondence for a color component. More specifically, FIG. 13A illustrates a photographic-area ground-color correction correspondence Gpr for the R component, FIG. 13B illustrates a photographic-area ground-color correction correspondence Gpg for the G component, and FIG. 13C illustrates a photographic-area ground-color correction correspondence Gpb for the B component. Each of the photographic-area ground-color correction correspondences includes at least features (5)-(7) described below, as depicted in FIGS. 13A-13C.

(5) A feature that, within a range in which an input pixel value is greater than or equal to 0 and smaller than a background color value P2r, P2g, P2b, an amount of change in the output pixel value increases in proportion to an amount of change in the input pixel value.

(6) A feature that any input pixel value that is greater than or equal to the background color value P2r, P2g, P2b is associated with the same output pixel value representing white.

(7) A feature that the output pixel value changes continuously with respect to the change in the input pixel value within an entire range of the input pixel value.

Alternatively, in feature (5), the amount of change in the output pixel value may increase along a curve.

Next, in step S520, the second execution portion 155 specifies one or more photographic areas Pha of the input color image CI with reference to the label value data stored in the volatile memory 220, and selects one photographic area on which processing of steps S522-S610 have not been performed yet, from the specified one or more photographic areas Pha, as a target photographic area.

Then, in step S522, the second execution portion 155 selects one color component on which processing of steps S524-S528 have not been performed yet, from the R, G, and B components, as the target color component.

After that, in step S524, the second execution portion 155 selects one pixel on which processing of step S526 has not been performed yet, from the pixels included in the target photographic area, as the target pixel.

Next, in step S526, the second execution portion 155 converts a target pixel value of the target color component of the target pixel into an output pixel value of the target color component, using the photographic-area ground-color correction correspondence for the target color component with reference to the color image data and the photographic-area ground-color correction correspondence data stored in the volatile memory 220, with the target pixel value being regarded as an input pixel value. Then, the second execution portion 155 stores the converted output pixel value in the volatile memory 220.

Then, in step S528, when all the pixels included in the target photographic area have not been selected as the target pixel (e.g. NO in step S528), the second execution portion 155 goes back to step S524. When all the pixels included in the target photographic area have been selected as the target pixel (e.g., YES in step S528), the second execution portion 155 goes to step S530.

In step S530, the second execution portion 155 determines whether all the three color components have been selected as the target color component. When all the color components have not been selected as the target color component (e.g., NO in step S530), the second execution portion 155 goes back to step S522. When all the color components have been selected as the target color component (e.g., YES in step S530), the second execution portion 155 goes to step S540.

In step S522-S530, the second execution portion 155 converts a pixel value of each color component of the target pixel in the target photographic area into an output pixel value using the photographic-area ground-color correction correspondence for a corresponding one of the three color components, with the pixel value being regarded as an input pixel value.

In step S540, the generation portion 145 specifies the output pixel value converted in step S526 with reference to the data stored in the volatile memory 220, and calculate an average color value of the target photographic area using the specified output pixel value for each color component. More specifically, the generation portion 145 calculates an average color value of the target photographic area of one color component (e.g., the R component) by adding up the converted pixel values of all the pixels included in the target photographic area and then dividing the sum total by the number of pixels. Similar to this, the generation portion 145 also calculates an average color value of the target photographic area for each of the other color components (e.g., the G component and the B component). Hereinafter, the average color value of the R component is also referred to as an average color value Pavr, the average color value of the G component is also referred to as average color value Pavg, and the average color value of the B component is also referred to as an average color value Pavb.

Next, in step S550, the generation portion 145 specifies the color component corresponding to the smallest average color value among the average color values Pavr, Pavg, Pavb as a reference color component.

Then, in step S560, the generation portion 145 generates, for each color component, white balance correspondence data defining a white balance correspondence by using the average color value of each color component, and then stores the generated white balance correspondence data for each color component in the volatile memory 220. In this case, the generation portion 145 specifies the white balance correspondences differently between the reference color component and the color components other than the reference color component. Hereinafter, the white balance correspondence will be described assuming that the B component is specified as the reference color component.

Figure 14A:
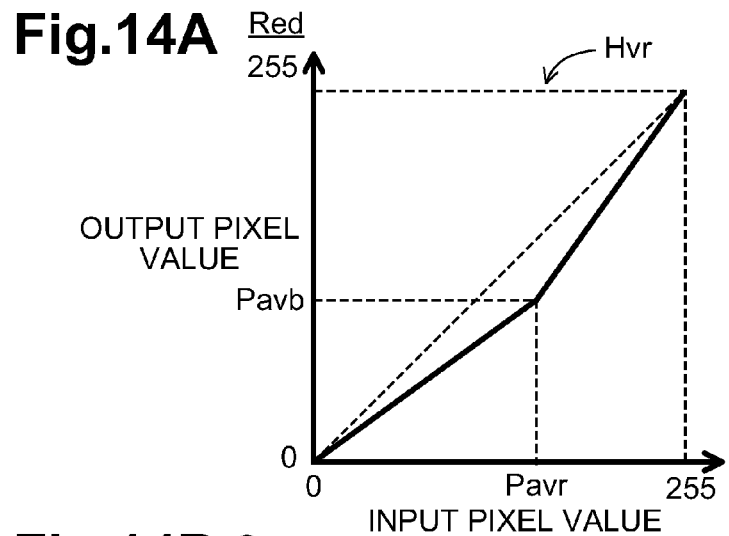
FIGS. 14A-14C each illustrate a white balance correspondence for a color component in the illustrative embodiment according to one or more aspects of the disclosure.
Figure 14B:
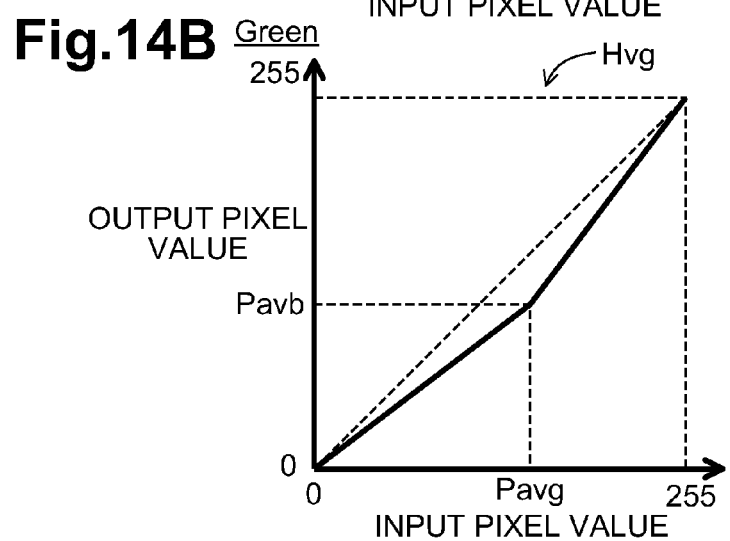
Figure 14C:
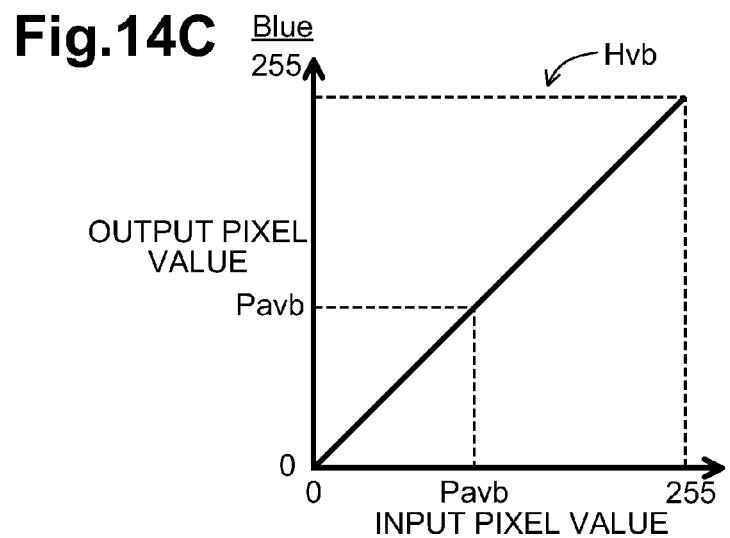

FIGS. 14A-14C each illustrate the white balance correspondence for a color component. More specifically, FIG. 14A illustrates a white balance correspondence Hvr for the R component, FIG. 14B illustrates a white balance correspondence Hvg for the G component, and FIG. 14C illustrates a white balance correspondence Hvb for the B component. The white balance correspondence corresponding to the reference color component includes at least feature (8) described below, as depicted in FIG. 14C.

(8) A feature that an output pixel value has the same value as an input pixel value of any value. In other words, an input pixel value is associated with an output pixel value having the same value as the input pixel value.

Each of the white balance correspondences corresponding to the color components other than the reference color component includes at least features (9)-(12), as depicted in FIGS. 14A and 14B.

(9) A feature that an input pixel value that is equal to an average color value of a corresponding color component is associated with an output pixel value that is equal to an average color value of a reference color component. For example, in an example in FIG. 14A, an input pixel value that is equal to the average color value Pavr of the R component is associated with an output pixel value that is equal to an average color value Pavb of the reference color component.

(10) A feature that, within a range in which an input pixel value is greater than or equal to 0 and smaller than an average color value of a corresponding color component, an amount of change in the output pixel value increases in proportion to the amount of change in the input pixel value.

(11) A feature that, within a range in which an input pixel value is greater than the average color value of a corresponding color component and smaller than or equal to 255, the amount of change in the output pixel value increases in proportion to the amount of change in the input pixel value.

(12) A feature that the output pixel value changes continuously with respect to the change of the input pixel value within an entire range of the input pixel value.

Next, in step S570, the third execution portion 160 selects one color component on which processing of steps S580-S600 have not been performed yet, from the color components other than the reference color component.

After that, in step S580, the third execution portion 160 selects one pixel from the pixels included in the target photographic area that have not been processed in step S590 as the target pixel.

Then, in step S590, the third execution portion 160 specifies the target pixel value of the target pixel with reference to data stored in the volatile memory 220, and coverts the specified target pixel value into an output pixel value of the target color component using the white balance correspondence corresponding to the target color component, with the target pixel being regarded as an input pixel value. At that time, the third execution portion 160 refers to the white balance correspondence data stored in the volatile memory 220. Further, the third execution portion 160 stores the converted output pixel value in the volatile memory 220.

Then, in step S600, when all the pixels included in the target photographic area have not been selected as the target pixel (e.g., NO in step S600), the third execution portion 160 goes back to step S580. When all the pixels included in the target photographic area have been selected as the target pixel (e.g., YES in step S600), the third execution portion 160 goes to step S610.

In step S610, the third execution portion 160 determines whether all the color components other than the reference color component have been selected. When all the color components other than the reference color component have not been selected (e.g. NO in step S610), the third execution portion 160 goes back to step S570. When all the color components other than the reference color component have been selected (e.g., YES in step S610), the third execution portion 160 goes to step S620.

In step S620, the third execution portion 160 determines whether all the photographic areas have been selected as the target photographic area. When all the photographic areas have not been selected as the target photographic area (e.g., NO in step S620), the third execution portion 160 goes back to step S520. When all the photographic areas have been selected as the target photographic area (e.g., YES in step S620), the third execution portion 160 ends the first photographic-area color adjustment processing.

As described above, the color adjustment is performed on the color image data acquired in step S20 in FIG. 2 in the first non-photographic-area ground-color correction processing (e.g., step S40) and the first photographic-area color adjustment processing (e.g., step S50), and thus, output color image data is completed. Then, the output color image data is stored in the volatile memory 220. The processing from the acquirement of the scan data in step S5 to the completion of the output color image data in the above-described image processing is included in the color adjustment processing (see FIG. 2).

After the completion of the output color image data, next, in step S100, the print data generation portion 165 performs a print data generation process using the output color image data stored in the volatile memory 220. More specifically, the print data generation portion 165 converts the output color image data, which is bitmap data consisting of pixel values of the R, G, and B components, into bitmap data (also, referred to as CMYK image data) consisting of pixel values by ink (here, for example, pixel values of C, M, Y, and K components). "C" refers to cyan, "M" refers to magenta, "Y" refers to yellow, and "K" refers to black. Then, the print data generation portion 165 performs a halftone process on the CMYK image data. In the halftone process, the print data generation portion 165 generates dot data representing dot formation conditions to generate print data representing the dot data. Then, the print data generation portion 165 stores the generated print data in the volatile memory 220.

Next, in step S110, the output portion 170 transmits the print data stored in the volatile memory 220 to the printer 240 to allow the printer 240 to perform printing of the print data. When printing is completed in the printer 240, the image processing depicted in FIG. 2 is completed.

A-2-2: Greyscale Printing Mode

When the printing operation mode selected by the user is a greyscale printing mode (e.g., GREYSCALE PRINTING MODE in step S10 in FIG. 2), in step S60, the acquisition portion 110 acquires grayscale image data and stores the acquired grayscale image data in the volatile memory 220. More specifically, the acquisition portion 110 converts the scan data that is bitmap data consisting of pixel values of the R, G, and B components into bitmap data consisting a component of the intensity value Y (i.e., bitmap data represented by a luminance component that is a single component) using the above-described Equation (EQ1) to acquire the converted bitmap data as grayscale image data subject to processing. An image represented by the obtained grayscale image data is also referred to as input grayscale image data. Another image processing will be described below assuming that the input grayscale image data includes a background image, a plurality of photographic images, and a text image similar to the input color image CI depicted in FIG. 3.

Next, in step S70 in FIG. 2, the image processing portion 100 performs second input-image segmentation processing based on the obtained grayscale image data. In the second input-image segmentation processing, a photographic area and a non-photographic area are identified in the input grayscale image data by the labeling process.

Figure 15:
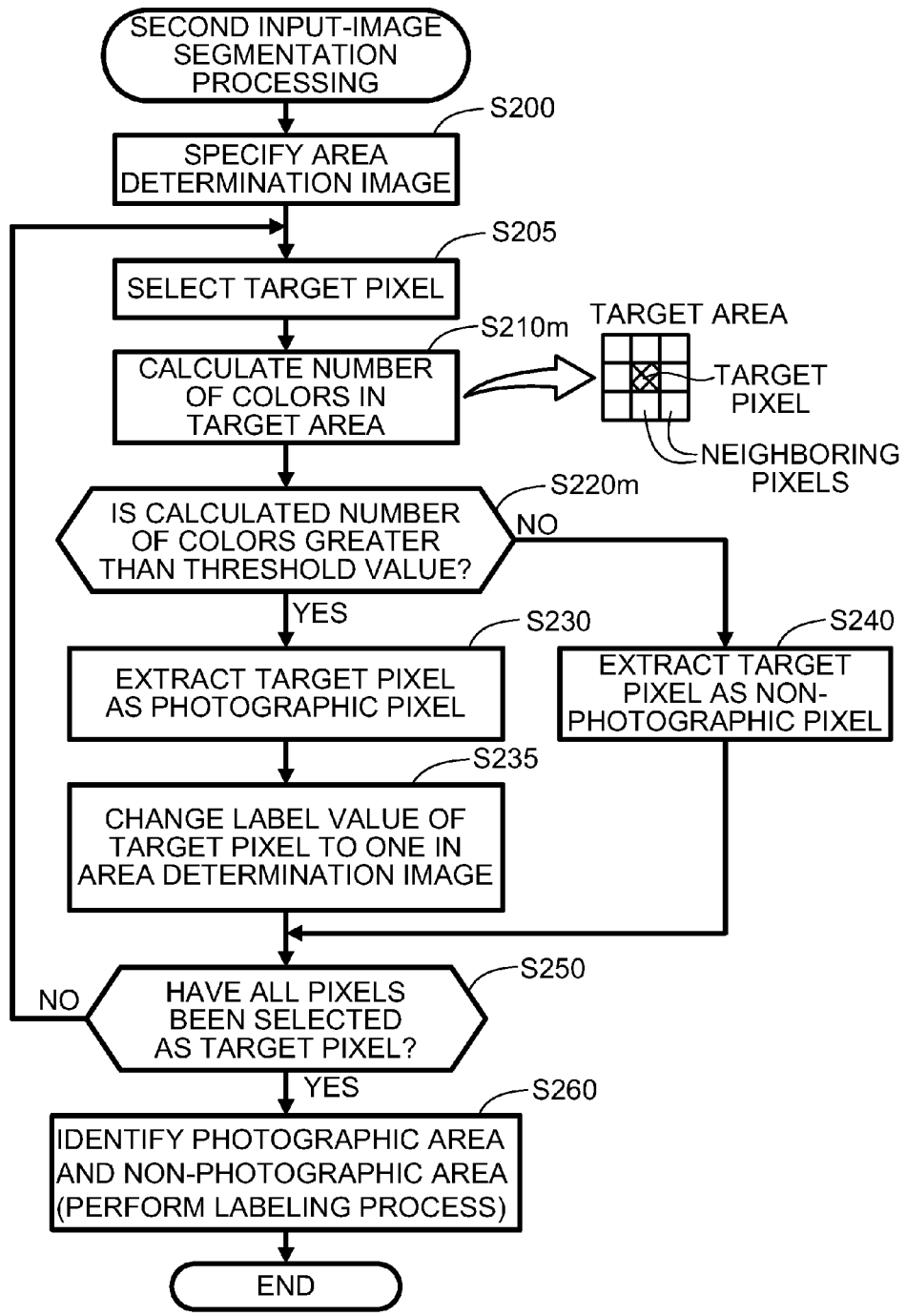
FIG. 15 is a flowchart depicting second input-image segmentation processing in the illustrative embodiment according to one or more aspects of the disclosure.

FIG. 15 is a flowchart depicting the second input-image segmentation processing. In the second input-image segmentation processing, steps whose details are the same as the details of steps of the first input-image segmentation processing in FIG. 4 are assigned the same step numbers, respectively, and descriptions of the steps are omitted.

Details of steps S200 and S205 in FIG. 15 are the same as the details of steps S200 and S205 in FIG. 4, respectively. In step S210m, the extraction portion 115 calculates the number of colors in the target area including the target pixel. In the illustrative embodiment, the target area is the same as the target area used in step S210 in FIG. 4. In the context of the present invention, the term color as applied in the grayscale printing mode process is understood to refer to gradations. More specifically, the extraction portion 115 generates a histogram Hy representing a frequency of occurrence of each pixel value (e.g., each intensity value Y) of the pixels included in the target area, and stores data representing the histogram Hy in the volatile memory 220. The histogram Hy is the same as the histogram Hr in FIG. 6, except that the horizontal axis is the intensity value Y in the histogram Hy. In the histogram Hy, similar to the histogram Hr depicted in FIG. 6, a range of 0-255 pixel values (i.e., intensity values Y 0-255) is divided into 16 groups Ar of 16 levels.

The extraction portion 115 calculates a group frequency by each group Ar by summing up counts of the frequency by each group Ar in the histogram Hy. Then, the extraction portion 115 determines one or more groups Ar whose each group frequency is greater than a predetermined threshold (e.g., 2) and obtains a number of determined groups Ar as the number of colors.

After the calculation of the number of colors in the target area, in step S220, the extraction portion 115 determines whether the calculated number of colors is greater than a threshold Th3 (e.g., 2). When the calculated number of colors is greater than the threshold Th3 (e.g., YES in step S220m), the extraction portion 115 extracts the target pixel as a photographic pixel (e.g., step S230) and then goes to step S235. Detail of step S235 is the same as the detail of step S235 in FIG. 4. When the calculated number of colors is smaller than or equal to the threshold Th3 (e.g., NO in step S220m), the extraction portion 115 extracts the target pixel as a non-photographic pixel (e.g., step S240).

In the second input-image segmentation processing, thereafter, similar to the first input-image segmentation processing depicted in FIG. 4, processing is performed on each of the pixels (e.g., step S250) and the labeling process is performed (e.g., step S260). Thus, a photographic area and a non-photographic area are identified in the grayscale image. The label value data stored in the volatile memory 220 represents the identified photographic area and non-photographic area.

After the second input-image segmentation processing in step S70 in FIG. 2, next, the image processing portion 100 performs second non-photographic-area ground-color correction processing (e.g., step S80). In the second non-photographic-area ground-color correction processing, a ground color that is a background color of the non-photographic area in the grayscale image is corrected to white.

Figure 16:
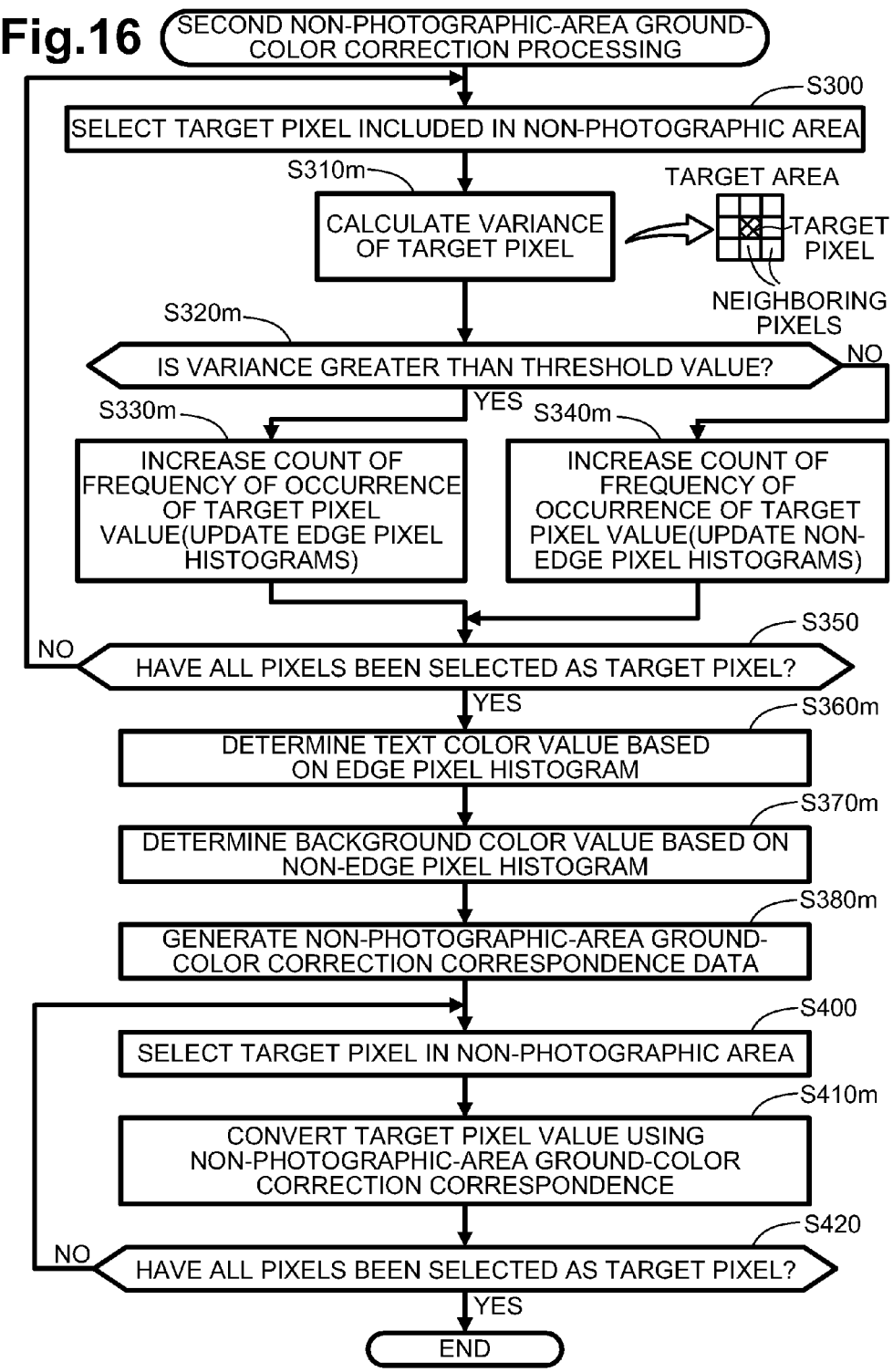
FIG. 16 is a flowchart depicting second non-photographic-area ground-color correction processing in the illustrative embodiment according to one or more aspects of the disclosure.

FIG. 16 is a flowchart depicting the second non-photographic-area ground-color correction processing. In the second non-photographic-area ground-color correction processing, steps whose details are the same as the details of steps of the first non-photographic-area ground-color correction processing in FIG. 8 are assigned the same step numbers, respectively, and descriptions of the steps are omitted.

Detail of step S300 in FIG. 16 is the same as the detail of step S300 in FIG. 8. In next step S310m, the extraction portion 115 calculates a variance of the target pixel with respect to its neighboring pixels. The target area is the same as the target area used in step S310 in FIG. 8. More specifically, the histogram generation portion 130 calculates a variance of the intensity value Y of the target pixel using the pixel values (i.e., the intensity values Y) of the nine pixels included in the target area.

Figure 17:
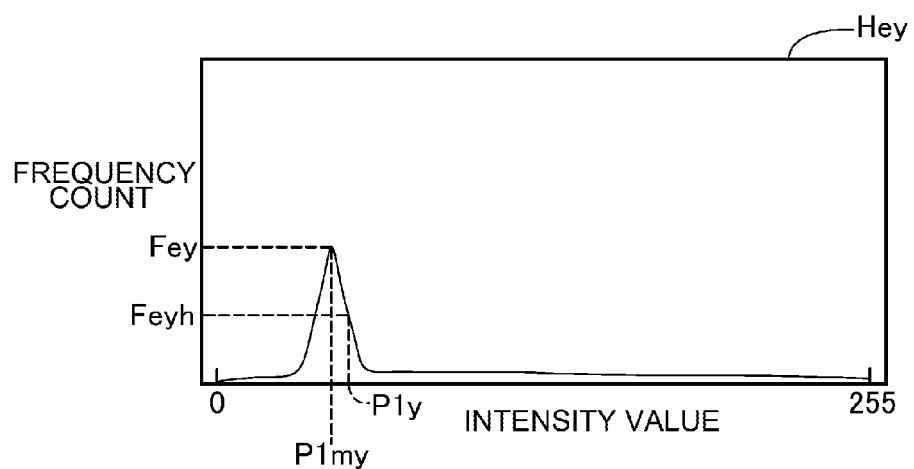
FIG. 17 illustrates an edge pixel histogram in the illustrative embodiment according to one or more aspects of the disclosure.

Then, in step S320m, the extraction portion 115 determines whether the calculated variance is greater than a threshold Th4. When the calculated variance is greater than the threshold Th4 (e.g., YES in step S320m), the extraction portion 115 determines that the target pixel is an edge pixel. After that, the histogram generation portion 130 performs a process in which the count of the frequency of occurrence of the target pixel value (i.e., the intensity value Y) of the target pixel (e.g., step S330m) is increased by one in an edge pixel histogram depicted in FIG. 17. FIG. 17 illustrates an edge pixel histogram Hey. The histogram generation portion 130 stores edge pixel histogram data representing the edge pixel histogram Hey in the volatile memory 220.

Figure 18:
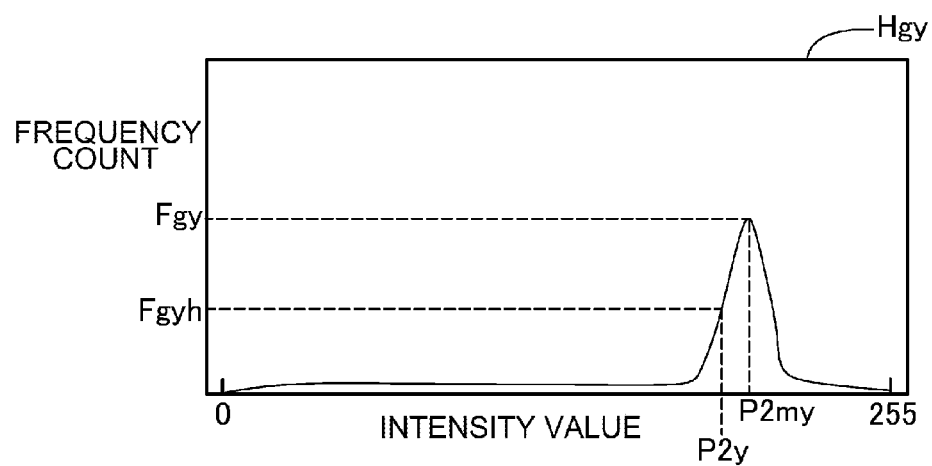
FIG. 18 illustrates a non-edge pixel histogram in the illustrative embodiment according to one or more aspects of the disclosure.

When the calculated variance is smaller than or equal to the threshold Th4 (e.g., NO in step S320m), the extraction portion 115 determines that the target pixel is a non-edge pixel. Then, the histogram generation portion 130 performs a process in which the count of the frequency of occurrence of the target pixel value is increased by one in a non-edge pixel histogram depicted in FIG. 18 (e.g., step S340m). FIG. 18 illustrates a non-edge pixel histogram Hgy. The histogram generation portion 130 stores non-edge pixel histogram data representing the non-edge pixel histogram Hgy in the volatile memory 220.

After all the pixels have been selected as the target pixel in the non-photographic area of the input grayscale image data (e.g., YES in step S350), in step S360m, the first determination portion 135 determines a text color value P1y based on the edge pixel histogram Hey depicted in FIG. 17 with reference to the edge pixel histogram data stored in the volatile memory 220. More specifically, the first determination portion 135 identifies a pixel value P1my having the highest frequency count Fey in the edge pixel histogram Hey. Then, the first determination portion 135 determines a pixel value that is greater than the pixel value P1my and has a frequency count Feyh that is half of the highest frequency count Fey, as a text color value P1y. After that, the first determination portion 135 stores text color value data representing the determined text color value P1y in the volatile memory 220.

In the illustrative embodiment, the first determination portion 135 determines a pixel value that is greater than a pixel value P1my and has a frequency that is half of the highest frequency count Fey, as a text color value P1y. Nevertheless, the method of determining the text color value is not limited to the specific embodiment. For example, in other embodiments, the first determination portion 135 may determine a pixel value that is greater than a pixel value P1my having the highest frequency count Fey and has a frequency count that is a predetermined percentage of the highest frequency count Fey, as a text color value P1y, wherein the predetermined percentage that is greater than 0 and smaller than 1 (i.e., Feyh=Fey×x (where 0<x<1)). Further, the first determination portion 135 may determine an average value or a median value of the pixel value of the edge pixel as the text color value P1y. Alternatively, the first determination portion 135 may determine the highest frequency count Fey itself as the text color value P1y.

Next, in step S370m, the second determination portion 140 determines a background color value P2y based on the non-edge pixel histogram Hgy depicted in FIG. 18 with reference to the non-edge pixel histogram data stored in the volatile memory 220. More specifically, the second determination portion 140 identifies a pixel value P2my having the highest frequency count Fgy in the non-edge pixel histogram Hgy. The second determination portion 140 determines a pixel value that is smaller than the pixel value P2my and has a frequency count Fgyh that is half of the highest frequency count Fgy, as a background color value P2y. The second determination portion 140 then stores background color value data representing the determined background color value P2y in the volatile memory 220.

In the illustrative embodiment, the second determination portion 140 determines a pixel value that is smaller than pixel value P2my and has a frequency count Fgyh that is half of the highest frequency count Fgy as a background color value P2y. Nevertheless, the method of determining the background color value is not limited to the specific embodiment. For example, in other embodiments, the second determination portion 140 may determine a pixel value that is smaller than a pixel value P2my having the highest frequency count Fgy and has a frequency count that is a predetermined percentage of the highest frequency count Fgy, as a background color value P2y, wherein the predetermined percentage that is greater than 0 and smaller than 1 (i.e., Fgyh=Fgy×x (where 0<x<1)). Further, the second determination portion 140 may determine an average value or a median value of the pixel value of the non-edge pixel as the background color value P2y. Alternatively, the second determination portion 140 may determine a pixel value of the highest frequency count Fgy itself as the background color value P2y.

Then, in step S380m, the generation portion 145 identifies the text color value P1y and the background color value P2y with reference to the text color value data and the background color value data stored in the volatile memory 220. Then, the generation portion 145 generates non-photographic-area ground-color correction correspondence data defining a non-photographic-area ground-color correction correspondence depicted in FIG. 19 based on the identified text color value P1y and background color value P2y, and stores the generated non-photographic-area ground-color correction correspondence data in the volatile memory 220. The non-photographic-area ground-color correction correspondence corresponds to the luminance component.

Figure 19:
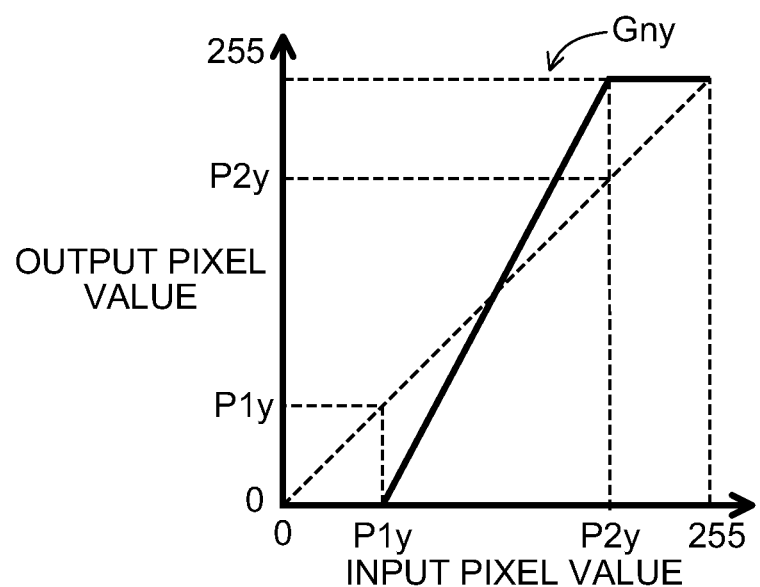
FIG. 19 illustrates a non-photographic-area ground-color correction correspondence in the illustrative embodiment according to one or more aspects of the disclosure.

FIG. 19 illustrates a non-photographic-area ground-color correction correspondence Gny. The non-photographic-area ground-color correction correspondence Gny includes at least features (13)-(16) described below, as depicted in FIG. 19.

(13) A feature that, within a range in which any input pixel value is greater than or equal to 0 and smaller than or equal to a text color value P1y, an output pixel value corresponding to the input pixel value is associated with the same value. In other words, a feature that any input pixel values that are smaller than or equal to the text color value P1y is associated with the same output pixel value representing black.

(14) A feature that, within a range in which an input pixel value is greater than the text color value P1y and smaller than a background color value P2y, an amount of change in the output pixel value increases in proportion to an amount of change in the input pixel value.

(15) A feature that any input pixel value that is greater than or equal to the background color value P2y is associated with the same output pixel value representing white.

(16) A feature that the output pixel value changes continuously with respect to the change of the input pixel value within an entire range of the input pixel value.

In feature (13), "the same pixel value representing black" is "0". Nevertheless, "the same pixel value" is not limited to the specific embodiment. In other embodiments, for example, any input pixel value that is smaller than or equal to a text color value P1y may be associated with "the same pixel value representing a color close to black" (i.e., a value greater than "0" (e.g., 5)). Generally speaking, any input pixel value that is smaller than or equal to a text color value P1y may be associated with "the same pixel value".

As described in feature (14), the amount of change in the output pixel value increases in proportion to the amount of change in the input pixel value within the range in which the input pixel value is greater than the text color value P1y and smaller than the background color value P2y. Nevertheless, this feature is not limited to the specific embodiment. For example, the output pixel value may increase along a curve. Generally speaking, the output pixel value may increase monotonically (may not decrease) within the range in which the input pixel value is greater than the text color value P1y and smaller than the background color value P2y. It is preferable to interpret the monotonic increase in the narrow sense rather than the broad sense.

After the generation of the non-photographic-area ground-color correction correspondence data (e.g., step S380m) and the selection of the target pixel in the non-photographic area (e.g., step S400), in step S410m, the first execution portion 150 converts a pixel value (e.g., an intensity value Y) of the target pixel into output pixel value using the non-photographic-area ground-color correction correspondence Gny with reference to the grayscale image data and the non-photographic-area ground-color correction correspondence data stored in the volatile memory 220, with the pixel value being regarded as an input pixel value. The first execution portion 150 stores the converted output pixel value in the volatile memory 220. The first execution portion 150 performs processing on each pixel included in the non-photographic area in step S410m (e.g., YES in step S420), and then ends the second non-photographic-area ground-color correction processing.

After the second non-photographic-area ground-color correction processing (e.g., step S80) depicted in FIG. 2, in step S90, the image processing portion 100 performs second photographic-area color adjustment processing. In the second photographic-area color adjustment processing, ground-color correction processing in which a ground color that is a background color of the photographic area in the input grayscale image data is corrected to white is performed.

Figure 20:
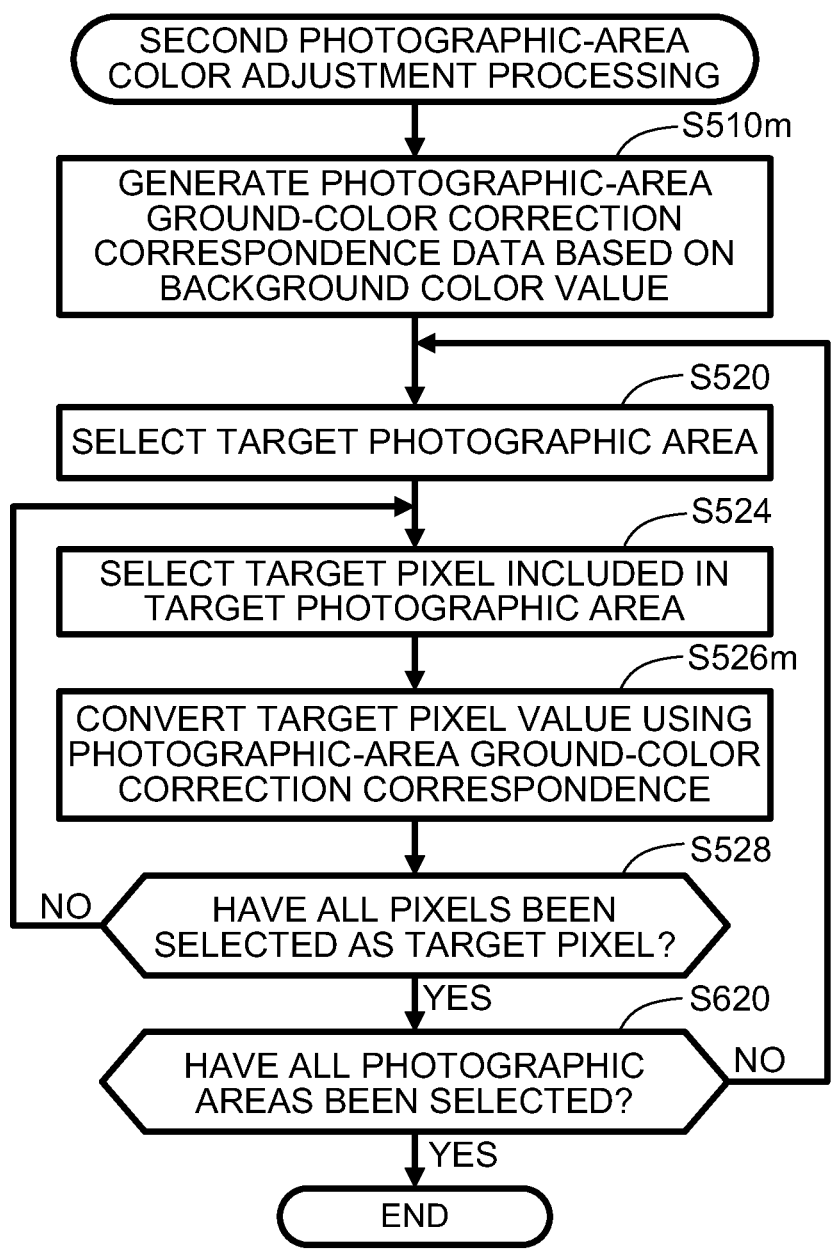
FIG. 20 is a flowchart depicting second photographic-area color adjustment processing in the illustrative embodiment according to one or more aspects of the disclosure.

FIG. 20 is a flowchart depicting the second photographic-area color adjustment processing. In the second photographic-area color adjustment processing, steps whose details are the same as the details of steps of the first non-photographic-area ground-color correction processing in FIG. 12 are assigned the same step numbers, respectively, and descriptions of the steps are omitted. First, in step S510m, the generation portion 145 identifies a background color value P2y with reference to the background color value data stored in the volatile memory 220. Then, the generation portion 145 generates photographic-area ground-color correction correspondence data defining a photographic-area ground-color correction correspondence based on the background color value P2y and stores the generated photographic-area ground-color correction correspondence data in the volatile memory 220.

Figure 21:
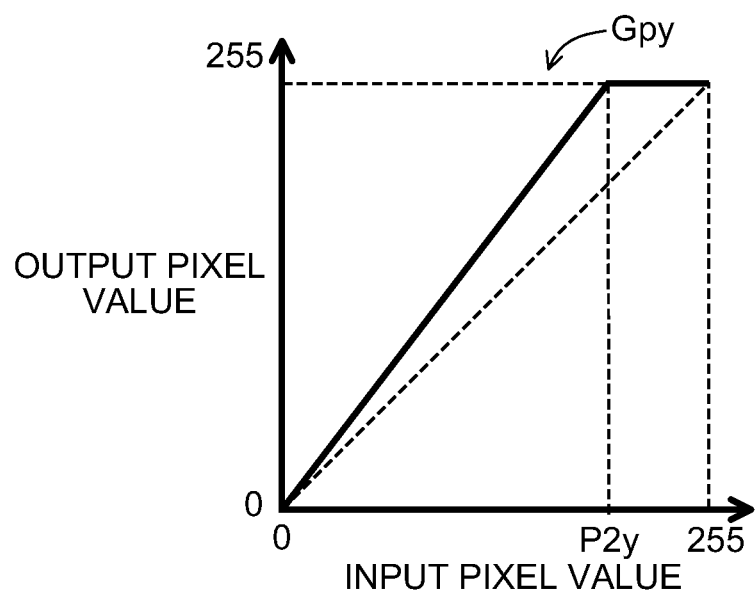
FIG. 21 illustrates a photographic-area ground-color correction correspondence in the illustrative embodiment according to one or more aspects of the disclosure.

FIG. 21 illustrates a photographic-area ground-color correction correspondence Gpy. The photographic-area ground-color correction correspondence includes at least features (17)-(19) described below, as depicted in FIG. 21.

(17) A feature that, within a range in which an input pixel value is greater than or equal to 0 and smaller than a background color value P2y, an amount of change in the output pixel value increases in proportion to an amount of change in the input pixel value.

(18) A feature that any input pixel value that is greater than or equal to the background color value P2y is associated with the same output pixel value representing white.

(19) A feature that the output pixel value changes continuously with respect to the change in the input pixel value within an entire range of the input pixel value.

In feature (17), for example, in other embodiments, an output pixel value may increase along a curve.

After a target photographic area is selected in step S520 and then a pixel included in the target photographic area is selected as the target pixel in step S524, in step S526m, the second execution portion 155 converts a target pixel value (e.g. intensity value Y) of the target pixel into an output pixel value using the photographic-area ground-color correction correspondence Gpy with reference to the grayscale image data and the photographic-area ground-color correction correspondence data the stored in the volatile memory 220, with the target pixel value (e.g. the intensity value Y) being regarded as an input pixel value. Then, second execution portion 155 stores the converted output pixel value in the volatile memory 220. The second execution portion 155 performs processing of step S526m on each pixel included in the target photographic area (e.g., step S528). After that, the second execution portion 155 performs processing of steps S524-S528 on each photographic area (e.g., step S620) and then ends the second photographic-area color adjustment processing.

As described above, the color adjustment is performed on the grayscale image data acquired in step S60 in FIG. 2 in the second non-photographic-area ground-color correction processing (e.g., step S80) and the second photographic-area color adjustment processing (e.g., step S90), and thus, output grayscale image data is completed. Then, the output grayscale image data is stored in the volatile memory 220. The processing from the acquirement of the scan data in step S5 to the completion of the output grayscale image data in the above-described image processing is included in the color adjustment processing (see FIG. 2).

After the completion of the output grayscale image data, next, in step S100, the print data generation portion 165 performs the print data generation process using the output grayscale image data stored in the volatile memory 220. More specifically, the print data generation portion 165 converts the output grayscale image data that is bitmap data consisting of the intensity values Y into bitmap data (i.e., CMYK image data) constituting pixel values of the C, M, Y, and K components. Then, the print data generation portion 165 performs the halftone process on the CMYK image data to generate print data representing dot data and stores the generated print data in the volatile memory 220.

Next, in step S110, the output portion 170 transmits the print data stored in the volatile memory 220 to the printer 240 to allow the printer 240 to perform printing of the print data. After printing is completed in the printer 240, the image processing depicted in FIG. 2 is completed.

In the multifunction peripheral 200 described in the above-described illustrative embodiment, the generation portion 145 generates each non-photographic-area ground-color correction correspondence data defining a non-photographic-area ground-color correction correspondence (FIGS. 11A-11C and 19) using a text color value (FIGS. 9A-9C and 17) such that the following two features differ from each other.

A feature that a pixel value that is smaller than or equal to a text color value determined using an edge pixel of a non-photographic area (e.g., the non-photographic area Npha) is converted into an output pixel value (i.e., a converted pixel value) with the pixel value being regarded as an input pixel value (i.e., an original pixel value).

A feature that a pixel value that is greater than a text color value is converted into an output pixel value (i.e., a converted pixel value) with the pixel value being regarded as an input pixel value (i.e. an original pixel value).

As described above, the non-photographic-area ground-color correction correspondence is defined using the edge pixel representing an area other than the background (e.g., the text image Ob4 in FIG. 3). Therefore, the non-photographic-area ground-color correction correspondence data defining a correspondence between the original pixel value and the converted pixel value can be generated appropriately in consideration of the color of an area other than the background.

In the multifunction peripheral 200 according to the above-described illustrative embodiment, the generation portion 145 generates each non-photographic-area ground-color correction correspondence data defining a non-photographic-area ground-color correction correspondence (see FIGS. 11A-11C and 19) using a background color value such that the following two features differ from each other.

A feature that a pixel value that is smaller than a background color value (FIGS. 10A-10C and 18) determined using a non-edge pixel of the non-photographic area (e.g., the non-photographic area Npha) is converted into an output pixel value (i.e., a converted pixel value) with the pixel value being regarded as an input pixel value (i.e., an original pixel value).

A feature that a pixel value that is greater than or equal to a background color value is converted into an output pixel value (i.e. a converted pixel value) with the pixel value being regarded as an input pixel value (i.e., an original pixel value).

As described above, the non-photographic-area ground-color correction correspondence is defined using the non-edge pixel representing an area (e.g., the background image Bg1 in FIG. 3) of the background. Therefore, the non-photographic-area ground-color correction correspondence data defining a correspondence between the original pixel value and the converted pixel value can be generated appropriately in consideration of the color of the background.

In the multifunction peripheral 200 according to the above-described illustrative embodiment, the generation portion 145 generates each non-photographic-area ground-color correction correspondence data defining a non-photographic-area ground-color correction correspondence (FIG. 11, FIG. 19) using a text color value (FIGS. 9A-9C and 17) and a background color value (FIGS. 10A-10C, FIG. 18) such that the following three features differ from one another.

A feature that a pixel value that is smaller than or equal to a text color value is converted into an output pixel value (i.e., a converted pixel value) with the pixel value being regarded as an input pixel value (i.e., an original pixel value).

A feature that a pixel value that is greater than a text color value and smaller than a background color value is converted into an output pixel value (i.e., a converted pixel value) with the pixel value being regarded as an input pixel value (i.e., an original pixel value).

A feature that a pixel value that is greater than or equal to a background color value is converted into an output pixel value (i.e., a converted pixel value) with the pixel value being regarded as an input pixel value (i.e., an original pixel value).

As described above, the non-photographic-area ground-color correction correspondence is defined using both of the edge pixel representing an area (e.g., the text image Ob4 in FIG. 3) other than the background and the non-edge pixel representing an area (e.g., the background image Bg1 in FIG. 3) of the background. Therefore, the non-photographic-area ground-color correction correspondence data defining a correspondence between the original pixel value and the converted pixel value can be generated appropriately in consideration of both of the color of the edge portion (e.g. a text color) and the color of the background.

In the multifunction peripheral 200 according to the above-described illustrative embodiment, when the color printing mode is selected, the generation portion 145 generates the non-photographic-area ground-color correction correspondence data defining the non-photographic-area ground-color correction correspondences Gnr, Gng, Gnb (see FIGS. 11A-11C), respectively, in each of which any input pixel value (i.e., an original pixel value) that is smaller than or equal to the text color value P1r, P1g, P1b is associated with an output pixel value (i.e., a converted pixel value) having the same value as the corresponding pixel value. Therefore, an unintended change in color that relates to pixels constituting an area other than a background and is a color of pixels having respective pixel values smaller than or equal to the text color value P1r, P1g, P1b (particularly, the color of an area in which such pixels gather (e.g., a portion inside of an edge of the text image Ob4 in FIG. 3)) can be reduced.

In the multifunction peripheral 200 according to the above-described illustrative embodiment, when the color printing mode is selected, the generation portion 145 generates, for each R, G, and B component, the non-photographic-area ground-color correction correspondence data defining the non-photographic-area ground-color correction correspondence Gnr, Gng, Gnb (see FIGS. 11A-11C) using the text color value P1r, P1g, P1b determined with respect to one of the R, G, and B components. Therefore, the correspondence data suitable to the color (e.g., a portion inside of an edge of a text image) of the edge pixel that may be any color can be generated.

In the multifunction peripheral 200 according to the above-described illustrative embodiment, when the grey-scale printing mode is selected, the generation portion 145 generates the non-photographic-area ground-color correction correspondence data defining the non-photographic-area ground-color correction correspondence Gny (see FIG. 19) in which any input pixel value that is smaller than or equal to the text color value P1y is associated with the same output pixel value (i.e., the converted pixel value). Therefore, the color of an area in which pixels having respective pixel values that are smaller than or equal to the text color value P1y (e.g., an area inside of an edge of a text image of input grayscale image data) is converted into the same color. Therefore, an occurrence of color irregularities can be reduced in such an area.

In the multifunction peripheral 200 according to the above-described illustrative embodiment, when the grey-scale printing mode is selected, the generation portion 145 uses the text color value P1y determined based on the single luminance component to generate the non-photographic-area ground-color correction correspondence data defining the non-photographic-area ground-color correction correspondence Gny (see FIG. 19) corresponding to a luminance component. Therefore, the non-photographic-area ground-color correction correspondence data can be generated appropriately.

In the multifunction peripheral 200 according to the above-described illustrative embodiment, when the grey-scale printing mode is selected, the generation portion 145 generates the non-photographic-area ground-color correction correspondence data defining the non-photographic-area ground-color correction correspondence Gny (FIG. 19) in which any input pixel value that is smaller than or equal to the text color value P1y is associated with the same output pixel value (i.e. a converted pixel value) representing black. Therefore, the color of an area in which pixels having respective pixel values that are smaller than or equal to the text color value P1y gather (e.g., an area inside an edge of a text image of input grayscale image data) is converted into black. Thus, this conversion facilitates an observer to observe the color-converted area.

In the multifunction peripheral 200 according to the above-described illustrative embodiment, the generation portion 145 generates the non-photographic-area ground-color correction correspondence data defining the non-photographic-area ground-color correction correspondence (see FIGS. 11A-11 and 19) in which an output pixel value (i.e., a converted pixel value) increases monotonically within a range in which the input pixel value (i.e., an original pixel value) is greater than a text color value and smaller than a background color value. Therefore, unnatural conversion of the color of pixels having respective pixel values that are greater than a text color value and smaller than a background color value (particularly, the color of an area in which such pixels gather (e.g., the color of an edge portion in the text image Ob4 in FIG. 3)) can be reduced.

In the multifunction peripheral 200 according to the above-described illustrative embodiment, the generation portion 145 generates the non-photographic-area ground-color correction correspondence data defining the non-photographic-area ground-color correction correspondence (see FIGS. 11A-11C and 19) in which any input pixel value (i.e. an original pixel value) that is greater than or equal to a background color value is associated with the same output pixel value (i.e., a converted pixel value) representing white. Therefore, the color of pixels having respective pixel values that are greater than or equal to the background color value (particularly, the color of an area in which such pixels gather (e.g., the color of a background image Bg1 in FIG. 3)) can be converted into white and an image represented by the converted pixel values can be represented by natural color.

In the multifunction peripheral 200 according to the above-described illustrative embodiment, the first determination portion 135 determines a value obtained using a pixel value having the highest frequency count, of the pixel values of the plurality of edge pixels in the non-photographic area (e.g., the non-photographic area Npha in FIG. 3), as the text color value (see FIGS. 9A-9C and 17). Therefore, a text color value can be determined appropriately.

In the multifunction peripheral 200 according to the above-described illustrative embodiment, the first determination portion 135 determines, of the pixel values of the plurality of edge pixels in the non-photographic area Npha in FIG. 3, a pixel value that is greater than a pixel value having the highest frequency count and has a frequency count that is a predetermined percentage of the highest frequency count (e.g., half of the highest frequency count in the illustrative embodiment), as the text color value (see FIGS. 9A-9C and 17). Therefore, a text color value can be determined more appropriately.

In the multifunction peripheral 200 according to the above-described illustrative embodiment, the generation portion 145 generates the non-photographic-area ground-color correction correspondence data defining the non-photographic-area ground-color correction correspondence (see FIGS. 11A-11C and 19) in which the pixel values of the edge and non-edge pixels included in the non-photographic area (e.g., the non-photographic area Npha in FIG. 3) is converted into respective output pixel values (i.e., a converted pixel value) with the pixel values being regarded as their input pixel values (i.e., an original pixel values), respectively, without the use of the plurality of photographic pixels included in the photographic area (e.g., the photographic area Pha in FIG. 3). Therefore, each pixel value of the edge and the non-edge pixels can be converted appropriately in the non-photographic area without influence of the photographic area (i.e., the photographic pixel).

In the multifunction peripheral 200 according to the above-described illustrative embodiment, the generation portion 145 generates the photographic-area ground-color correction correspondence data defining the photographic-area ground-color correction correspondence (see FIGS. 13A-13C and 21) and the non-photographic-area ground-color correction correspondence data defining the non-photographic-area ground-color correction correspondence (FIGS. 11A-11C and 19) such that their output pixel values (i.e., converted pixel values) described below have respective different values.

An output pixel value (i.e., a converted pixel value) obtained by which at least one pixel value in an entire range of pixel value is converted using a photographic-area ground-color correction correspondence.

An output pixel value (i.e., a converted pixel value) obtained by which the at least one pixel value (i.e., an original pixel value) is converted using a non-photographic-area ground-color correction correspondence.

Therefore, in an input image (e.g., the input color image CI or the input grayscale image data), correspondence data each of which defines a correspondence appropriate for one of a photographic area (i.e., a plurality of photographic pixels) and a non-photographic area (i.e., a plurality of non-photographic pixels) can be generated.

In the multifunction peripheral 200 according to the above-described illustrative embodiment, the generation portion 145 generates the photographic-area ground-color correction correspondence data and the non-photographic-area ground-color correction correspondence data in the input image (e.g., the input color image CI or the input grayscale image data) by using the background image (i.e., a plurality of background pixels) included in the non-photographic area (i.e., a plurality of non-photographic pixels). The photographic area and the non-photographic area are generated on an image (i.e., an input image) represented by scan data generated by which a document is read. Therefore, influence of the color of the medium (e.g., paper) of the document on the photographic image and the non-photographic image of the image represented by the converted pixel values can be reduced by using the value obtained based on the plurality of background pixels (i.e., a background color value (see FIGS. 10A-10C and 18)) in common in the photographic-area ground-color correction correspondence data and the non-photographic-area ground-color correction correspondence data.

In the multifunction peripheral 200 according to the above-described illustrative embodiment, the generation portion 145 generates the white balance correspondence data defining the white balance correspondence used for converting pixel values (i.e., pixel values on which a ground color correction has been performed) using an appropriate one of the photographic-area ground-color correction correspondences Gpr, Gpg, Gpb into the output pixel values (i.e., converted pixel values) whose white balance has been adjusted. Therefore, when the white balance is performed, influence of the color of a medium (e.g., paper) of a document on an image can be reduced.

In the multifunction peripheral 200 according to the above-described illustrative embodiment, the generation portion 145 defines the photographic correspondence for each photographic area. Therefore, a suitable color adjustment can be performed on each photographic area.

In the multifunction peripheral 200 according to the above-described illustrative embodiment, the generation portion 145 generates the non-photographic-area ground-color correction correspondence data defining the single non-photographic-area ground-color correction correspondence (FIGS. 11A-11C and 19) with respect to the single non-photographic area. As described above, when a color adjustment is performed on a single non-photographic area, a single non-photographic-area ground-color correction correspondence is used. Therefore, an occurrence of local inconsistencies in an image represented by converted pixel values can be reduced.

In the multifunction peripheral 200 according to the above-described illustrative embodiment, the extraction portion 115 extracts the target pixel using the number of colors in the input-image segmentation processing (FIGS. 4 and 15), as one of the photographic pixel and the non-photographic pixel. Therefore, a photographic pixel or a non-photographic pixel can be extracted easily.

In the multifunction peripheral 200 according to the above-described illustrative embodiment, the generation portion 145 calculates the average color value for each color component in the first photographic-area color adjustment processing (see FIG. 12) and generates the white balance correspondence data defining the white balance correspondence for each color component using the smallest average color value. Therefore, color of an image represented by converted pixel values on which the white balance has been performed can be restricted to become lighter unnaturally.

The text color value P1r, P1g, P1b, P1y of the above-described illustrative embodiment corresponds to a first reference value. The background color value P2r, P2g, P2b, P2y corresponds to a second reference value.

B. Variations

Variation 1: FIG. 22 illustrates a network system according to a variation of the illustrative embodiment. In variation 1, as depicted in FIG. 22, the multifunction peripheral 200 is configured to be connected with a personal computer 300 via a local area network ("LAN") 500. Further, the multifunction peripheral 200 is configured to be connected with a server 400 via the LAN 500 and the Internet 600, as depicted in FIG. 22. In this case, the functions of the image processing portion 100 (FIG. 1) of the multifunction peripheral 200 may be partially shared between the personal computer 300 and the server 400, and the whole network system may implement the functions of the image processing portion 100. The system comprising the plurality of devices corresponds to an image processing device. For example, as depicted in FIG. 22, the first determination portion 135 and the generation portion 145 may be implemented by a CPU 410 of the server 400. In this case, the whole of the multifunction peripheral 200 and the server 400 corresponds to the image processing device. The CPU 210 of the multifunction peripheral 200 implements functions of a first image-processing portion 100a that comprises the processing portions of the image processing portion 100 (see FIG. 1) except the first determination portion 135 and the generation portion 145. The server 400 comprises the CPU 410 and a memory (not depicted). The CPU 410 implements functions of a second image-processing portion 100b comprising the first determination portion 135 and the generation portion 145 by executing a program. In this case, data necessary for progress of processing is transmitted and received between the processing portion of the multifunction peripheral 200 and the processing portion of the server 400. For example, the first determination portion 135 acquires data representing an edge pixel histogram from the histogram generation portion 130 of the multifunction peripheral 200. The generation portion 145 acquires data representing background color values P2r, P2g, P2b, respectively, from the second determination portion 140 of the multifunction peripheral 200. The execution portions 150, 155, 160 acquire correspondence data from the generation portion 145 of the server 400.

In the above-described illustrative embodiment, the multifunction peripheral 200 implements the functions of the image processing portion 100. Nevertheless, the disclosure is not limited to the specific embodiment. For example, in other embodiments, the functions of the image processing portion 100 may be implemented by various other devices (e.g., a digital camera, a scanner, a personal computer, or a smartphone).

Variation 2: In the above-described illustrative embodiment, the acquisition portion 110 acquires the image data based on the scan data obtained from the scanner 230. Nevertheless, the disclosure is not limited to this variation. The acquisition portion 110 may acquire image data in another manner. For example, the acquisition portion 110 may acquire image data from a storage medium, e.g., a memory card, via the card slot portion 270. Alternatively, the acquisition portion 110 may acquire image data from an external device via the communication portion 280.

Variation 3: In the above-described illustrative embodiment, the image processing portion 100 generates the print data based on the bitmap data (e.g., the output color image data or the output grayscale image data) generated in the color adjustment processing (see FIG. 2) and the printing of the print data is performed. Nevertheless, the disclosure is not limited to the specific embodiment. For example, in other embodiments, the output portion 170 of the image processing portion 100 may output bitmap data generated in the color adjustment processing to a storage medium, e.g., a memory card, via the card slot portion 270. The output portion 170 may transmit bitmap data generated in the color adjustment processing to an external device (e.g., the personal computer 300 or the server 400 in FIG. 22) connected to the LAN or the Internet, via the communication portion 280. Generally, the output portion 170 may output image data generated by image processing including the color adjustment processing (see FIG. 2) to a predetermined image output device (e.g., the printer 240 or the display portion 250) or a user-specified device (e.g., the memory card attached to the card slot portion 270). Alternatively, the print data generation portion 165 may be omitted.

Variation 4: In the input-image segmentation processing (see FIGS. 4 and 15) according to the above-described illustrative embodiment, the extraction portion 115 calculates each group frequency using the histogram representing the frequency of occurrence of each pixel value of the pixel in the target area and further obtains the number of groups whose group frequency is greater than the predetermined threshold, as the number of colors. Nevertheless, the disclosure is not limited to the specific embodiment. For example, in other embodiments, various values correlated with the number of colors used in a target area may be adopted to the number of colors. For example, the extraction portion 115 calculates the number of pixel values whose frequency count is greater than a predetermined threshold value in a histogram representing a frequency of occurrence of each pixel value of a pixel in a target area, as the number of colors.

Variation 5: The input image (e.g., the input color image or the input grayscale image data) represented by the image data acquired by the acquisition portion 110 in the above-described illustrative embodiment may comprise a drawing image (e.g., illustrations, tables, diagrams, or patterns) drawn using a computer. In this case, it is preferable that the threshold value Th1, Th3 used in the input-image segmentation processing (see FIGS. 4 and 15) be preset such that the extraction portion 115 extracts a pixel constituting the drawing image as a non-photographic pixel.

Variation 6: In the above-described illustrative embodiment, the extraction portion 115 determines whether the target pixel is an edge pixel or a non-edge pixel using a variance in the non-photographic-area ground-color correction processing (FIGS. 8 and 16). Nevertheless, the disclosure is not limited to the specific embodiment. For example, in other embodiments, a desired known method can be adapted to the method for determining whether the target pixel is an edge pixel or a non-edge pixel. For example, the extraction portion 115 may calculate an edge intensity in a target area and determine whether the target pixel is an edge pixel or a non-edge pixel based on the edge intensity. Various edge detection filters, for example, the Sobel filter, the Prewitt filter, or the Roberts filter, can be used for the calculation of the edge intensity.

Variation 7: In the above-described illustrative embodiment, a color space representing color image data subject to the color adjustment processing (see FIG. 2) is not limited to an RGB color space and an arbitrary color space (e.g., a YCbCr color space) that can represent a color image can be adopted. An arbitrary component (e.g., a green component (G component)) representing luminance can be adopted as a component representing grayscale image data subject to the color adjustment processing (see FIG. 2).

Variation 8: In the above-described illustrative embodiment, the non-photographic-area ground-color correction correspondences for the respective color components (see FIGS. 11A-11C) each may include feature (20) described below instead of feature (1).

(20) A feature that within a range in which an input pixel value that is smaller than or equal to a text color value, an output pixel value corresponding to the input pixel value is associated with the same value representing black. In other words, a feature that any input pixel value that is smaller than or equal to a text color value P1y is associated with the same output pixel value representing black.

The non-photographic-area ground-color correction correspondence (see FIG. 19) may include feature (21) described below instead of feature (13).

(21) A feature that, within a range in which an input pixel value is smaller than or equal to a text color value, an output pixel value has the same value as the input pixel value. In other words, a feature that any input pixel value that is smaller than or equal to a text color value is associated with an output pixel value that is the same value as the input pixel value.

Variation 9: Part of the configurations implemented by hardware in the above-described illustrative embodiment may be replaced with software, or conversely, part of the configurations implemented by software in the above-described illustrative embodiment may be replaced with hardware.

Although the disclosure has been described based on illustrative embodiments and variations, the illustrative embodiments of the disclosure facilitate the understanding of the disclosure and do not limit the disclosure. The disclosure may be changed or modified without departing from the spirit of the invention and the scope of the claims and includes the equivalents thereof.

What is claimed is:

1. An image processing device comprising:
   a processor; and
   a memory storing computer-readable instructions therein, the computer-readable instructions, when executed by the processor, causing the image processing device to perform:
   acquiring target image data including each pixel value of a plurality of pixels, the target image data representing a target image by using the plurality of pixels;
   extracting a plurality of photographic pixels and a plurality of non-photographic pixels from the plurality of the pixels in the target image;
   determining a text color value by using a plurality of text pixels included in the plurality of non-photographic pixels, the plurality of text pixels constituting a text image;
   determining a background color value by using a plurality of background pixels included in the plurality of non-photographic pixels, the plurality of background pixels constituting a background image;
   storing the background color value in the memory;
   generating non-photographic correspondence data by using the text color value and the stored background color value;
   converting, by using the non-photographic correspondence data, each original pixel value of the plurality of non-photographic pixels into a corresponding one converted pixel value, respectively, the non-photographic correspondence data including a first feature used to convert each original pixel value smaller than the background color value and a second feature used to convert each original pixel value greater than or equal to the background color value;
   generating, without determining a background color value again, photographic correspondence data by using the stored background color value without using the text color value, the photographic correspondence data being different from the non-photographic correspondence data; and
   converting, by using the photographic correspondence data, each original pixel value of the plurality of photographic pixels into a corresponding one converted pixel value, respectively, the photographic correspondence data including a third feature used to convert each original pixel value smaller than the background color value and the second feature,
   wherein a first converted pixel value, into which a specific original pixel value smaller than the background color value is converted using the first feature, is different from a second converted pixel value, into which the specific original pixel value is converted using the third feature, and
   wherein the second feature is used to convert each original pixel value into a corresponding one converted pixel value all have a same value, respectively.

2. The image processing device according to claim 1, wherein the photographic correspondence data comprises:
   a color correction correspondence data to be generated by using the stored background color value without using the text color value, the color correction correspondence data to be used to convert each original pixel value of the plurality of photographic pixels into a corresponding one color corrected pixel value, respectively; and
   a white balance correspondence data to be used to convert each color corrected pixel value into a corresponding one converted pixel value, respectively.

3. The image processing device according to claim 1, wherein the photographic correspondence data comprises a color correction correspondence data to be used to convert each original pixel value of the plurality of photographic pixels into a corresponding one converted pixel value, respectively.

4. The image processing device according to claim 1, wherein the computer-readable instructions, when executed by the processor, further cause the image processing device to perform:
   identifying a first photographic area and a second photographic area subsequent to extraction of the plurality of photographic pixels, the first photographic area being constituted by a first contiguous group of one or more of the plurality of photographic pixels, the second photographic area being constituted by a second contiguous group of one or more of the plurality of photographic pixels, the first contiguous group and the second contiguous group being unconnecting each other,
   wherein the photographic correspondence data includes first photographic correspondence data and second photographic correspondence data when the first photographic area and the second photographic area are identified,
   wherein the first photographic correspondence data is associated with the first photographic area and the second photographic correspondence data is associated with the second photographic area, and
   wherein the first photographic correspondence data is different from the second photographic correspondence data.

5. The image processing device according to claim 4, wherein all of the plurality of non-photographic pixels constitute a single non-photographic area.

6. The image processing device according to claim 1, wherein the extracting comprises:
   extracting a target pixel from the plurality of pixels by defining a target area including the target pixel and a plurality of neighboring pixels arranged around the target pixel, the plurality of neighboring pixels included in the plurality of pixels;
calculating a number of colors in the target area;
identifying the target pixel as either one of the plurality of photographic pixels and one of the plurality of non-photographic pixels based on the calculated number of colors.

7. The image processing device according to claim 1, wherein the photographic correspondence data includes white balance correspondence data for each of a plurality of color components representing the plurality of photographic pixels, and the white balance correspondence data is generated by using a smallest average pixel value selected from among respective average pixel values of each of the plurality of color components.

8. The image processing device according to claim 1, wherein the plurality of non-photographic pixels form at least one of a text image, a drawing image, and a background image.

9. The image processing device according to claim 1, wherein the plurality of photographic pixels form at least one photographic image.

10. The image processing device according to claim 1, wherein the target image data has a plurality of color components, and each of the pixel values of the plurality of pixels has a respective plurality of color component values,
wherein the photographic correspondence data includes a respective photographic correspondence data for each of the plurality of color components, and
wherein the non-photographic correspondence data includes a respective non-photographic correspondence data for each of the plurality of color components.

11. The image processing device according to claim 1,
wherein the background color value is greater than the text color value,
wherein the first feature includes a fourth feature used to convert each original pixel value smaller than or equal to the text color value and a fifth feature used to convert each original pixel value greater than the text color value and smaller than the background color value, and
wherein the fourth feature is used to convert each original pixel value into a corresponding one converted pixel value having the same value as each original pixel value, respectively.

12. The image processing device according to claim 1,
wherein the background color value is greater than the text color value,
wherein the first feature includes a fourth feature used to convert each original pixel value greater than the text color value and smaller than the background color value and a fifth feature used to convert each original pixel value smaller than or equal to the text color value, and
wherein the fifth feature is used to convert each original pixel value into a corresponding one converted pixel value all having the same value, respectively.

13. A non-transitory computer-readable medium configured to store computer-readable instructions executable by a processor of an image processing device for performing a process comprising:
acquiring target image data including each pixel value of a plurality of pixels, the target image data representing a target image by using the plurality of pixels;
extracting a plurality of photographic pixels and a plurality of non-photographic pixels from the plurality of the pixels in the target image;
determining a text color value by using a plurality of text pixels included in the plurality of non-photographic pixels, the plurality of text pixels constituting a text image;
determining a background color value by using a plurality of background pixels included in the plurality of non-photographic pixels, the plurality of background pixels constituting a background image;
storing the background color value in the memory;
generating non-photographic correspondence data by using the text color value and the stored background color value;
converting, by using the non-photographic correspondence data, each original pixel value of the plurality of non-photographic pixels into a corresponding one converted pixel value, respectively, the non-photographic correspondence data including a first feature used to convert each original pixel value smaller than the background color value and a second feature used to convert each original pixel value greater than or equal to the background color value;
generating, without determining a background color value again, photographic correspondence data by using the stored background color value without using the text color value, the photographic correspondence data being different from the non-photographic correspondence data; and
converting, by using the photographic correspondence data, each original pixel value of the plurality of photographic pixels into a corresponding one converted pixel value, respectively, the photographic correspondence data including a third feature used to convert each original pixel value than the background color value and the second feature,
wherein a first converted pixel value, into which a specific original pixel value smaller than the background color value is converted using the first feature, is different from a second converted pixel value, into which the specific original pixel value is converted using the third feature, and
wherein the second feature is used to convert each original pixel value into a corresponding one converted pixel value all have a same value, respectively.

14. A non-transitory computer-readable medium configured to store computer-readable instructions executable by a processor of an image processing device for performing a process comprising:
obtaining a plurality of photographic pixels and a plurality of non-photographic pixels from a plurality of pixels in a target image;
determining a text color value by using a plurality of text pixels included in the plurality of non-photographic pixels, the plurality of text pixels constituting a text image determining a background color value by using a plurality of background pixels included in the plurality of non-photographic pixels, the plurality of background pixels constituting a background image;
storing the background color value in the memory;
generating non-photographic correspondence data by using the text color value and the stored background color value;
converting, by using the non-photographic correspondence data, each original pixel value of the plurality of non-photographic pixels into a corresponding one converted pixel value, respectively, the non-photographic correspondence data including a first feature used to convert each original pixel value smaller than the background color value and a second feature used to convert each original pixel value greater than or equal to the background color value;

generating, without determining a background color value again, photographic correspondence data by using the stored background color value without using the text color value, the photographic correspondence data being different from the non-photographic correspondence data; and converting by using the photographic correspondence data, each original pixel value of the plurality of photographic pixels into a corresponding one converted pixel value, respectively, the photographic correspondence data including a third feature used to convert each original pixel value smaller than the background color value and the second feature, wherein a first converted pixel value, into which a specific original pixel value smaller than the background color value is converted using the first feature, is different from a second converted pixel value, into which the specific original pixel value is converted using the third feature, and wherein the second feature is used to convert each original pixel value into a corresponding one converted pixel value all have a same value, respectively.

* * * * *